United States Patent
Xu et al.

(10) Patent No.: US 11,902,944 B2
(45) Date of Patent: Feb. 13, 2024

(54) ELECTRONIC APPARATUS, WIRELESS COMMUNICATION METHOD, AND COMPUTER READABLE STORAGE MEDIUM

(71) Applicant: Sony Corporation, Tokyo (JP)

(72) Inventors: Xiaodong Xu, Beijing (CN); Guanyu Chen, Beijing (CN); Mengying Sun, Beijing (CN); Yingting Yuan, Beijing (CN); Wenbo Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 570 days.

(21) Appl. No.: 17/259,556

(22) PCT Filed: Aug. 2, 2019

(86) PCT No.: PCT/CN2019/098957
§ 371 (c)(1),
(2) Date: Jan. 12, 2021

(87) PCT Pub. No.: WO2020/029869
PCT Pub. Date: Feb. 13, 2020

(65) Prior Publication Data
US 2021/0168798 A1    Jun. 3, 2021

(30) Foreign Application Priority Data

Aug. 10, 2018 (CN) .......................... 201810909120.1

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC . H04W 72/0446; H04W 72/23; H04W 72/27; H04L 5/0007; H04L 5/16; H04L 5/0053
See application file for complete search history.

(56) References Cited

U.S. PATENT DOCUMENTS

2018/0131487 A1* 5/2018 Ly .................. H04L 5/0048
2021/0168798 A1* 6/2021 Xu .................. H04W 72/27

FOREIGN PATENT DOCUMENTS

| WO | 2018/060816 A1 | 4/2018 |
| WO | 2018/089662 A1 | 5/2018 |

(Continued)

OTHER PUBLICATIONS

LG Electronics:"Discussions on NR IAB support", 3GPP Draft; R1-1806649 Discussions on IAB Support_V4, 3rd Generation Partnership Project (3GPP), Mobile Competence Centre 650, Route Des Lucioles ; F-06921 Sophia-Antipolis Cedex ; France vol. RAN WG1, No. Busan, Korea; May 21, 2018-May 25, 2018 May 2, 2018 (May 20, 2018), XP051441851, URL:http://www.3gpp.org/ftp/Meetings%5F3GP P%5FSYNC/RAN1/Docs/.

(Continued)

*Primary Examiner* — Jamal Javaid
(74) *Attorney, Agent, or Firm* — XSENSUS LLP

(57) ABSTRACT

The present disclosure relates to an electronic apparatus, a wireless communication method, and a computer readable storage medium. The electronic apparatus in an integrated access and backhaul (IAB) system according to the present disclosure comprises a processing circuit, and is configured to: configure, according to the electronic apparatus and a subcarrier interval of a link between sub-nodes of the electronic apparatus, a slot formatting cycle for the link, the slot formatting cycle comprising a pre-determined number of slots; and configure, for the link, a slot format of each slot in one slot format cycle. The electronic apparatus, the wireless communication method, and the computer readable (Continued)

storage medium of the present disclosure optimize slot format configuration in IAB systems.

18 Claims, 14 Drawing Sheets

(56) References Cited

FOREIGN PATENT DOCUMENTS

| WO | 2018/144471 A1 | 8/2018 |
|---|---|---|
| WO | 2018/145019 A1 | 8/2018 |

OTHER PUBLICATIONS

Nokia et al:"Dynamic resource allocation between backhaul and access links", 3GPP Draft; R1-1806662 IAB Resource Allocation, 3rd Generation Partnership Project (3GPP), Mobile Competence Centre 650, Route Des Lucioles ; F-06921 Sophia-Antipolis Ced Ex ; France vol. RAN WG1, No. Busan, Korea, May 21, 2018-May 25, 2018 May 20, 2018 (May 20, 2018), XP051441864, URL:http://www.3gpp.org/ftp/Maeetings%5F3GPP%5FSYNC/RAN1/Docs/.

OPPO : "Discussion of backhaul link enhancement for IAB" ,3GPP Draft: R1-1806859, 3rd Generation Partnership Project (3GPP), Mobile Competence Centre ; 650, Route Des Lucioles ; F-06921 Sophia-Antipolis Cedex : France vol. RAN WG1. No. Busan, Korea: May 21, 2018-May 25, 2018 May 20, 2018 (May 20, 2018), XP051442058, URL:http://www.3gpp.org/ftp/Meetings%5F3GPP%5FSYNC/RAN1/Docs/.

Sony: "Resource allocation in IAB", 3GPP Draft: R2-1811417. 3rd Generation Partnership Project (3GPP), Mobile Competence Centre : 650, Route Des Lucioles : F-06921 Sophia-Antipolis Cedex : France vol. RAN WG2, No. Gothenburg. Sweden; Aug. 20, 2018-Aug. 24, 2018 Aug. 9, 2018 (Aug. 9, 2018), XP051821073, URL:http://www.3gpp.org/ftp/tsg%$Fran/WG2%5 FRL2/TSGR2%5 F103/Docs/R2%2D18114:7%2Ezip.

International Search Report and Written Opinion dated Oct. 29, 2019, received for PCT Application No. PCT/CN2019/098957, filed on Aug. 2, 2019, 10 Pages including English Translation.

LG Electronics, "Remaining Issues on Group Common Pdcch", 3GPP TSG RAN WG1 #92, R1-1802208, Athens, Greece, Feb. 26-Mar. 2, 2018, pp. 1-12.

LG Electronics, "Remaining Issues on Group Common Pdcch", 3GPP TSG RAN WG1 #92 bis, R1-1804552, Sanya, China, Apr. 16-20, 2018, pp. 1-9.

Catt, "Contents of the Group-Common PDCCH", 3GPP TSG RAN WG1 Meeting No. 90, R1-1712397, Prague, Czechia, Aug. 21-25, 2017, 6 pages.

\* cited by examiner

ELECTRONIC APPARATUS, WIRELESS COMMUNICATION METHOD, AND COMPUTER READABLE STORAGE MEDIUM

CROSS-REFERENCE TO RELATED APPLICATIONS

The present application is based on PCT filing PCT/CN2019/098957, filed Aug. 2, 2019, which claims the priority to Chinese Patent Application No. 201810909120.1, titled "ELECTRONIC APPARATUS, WIRELESS COMMUNICATION METHOD, AND COMPUTER READABLE STORAGE MEDIUM", filed on Aug. 10, 2018 with the China National Intellectual Property Administration, each of which is incorporated herein by reference in its entirety.

TECHNICAL FIELD

The present disclosure relates to the technical field of wireless communications, and in particular to an electronic apparatus, a wireless communication method, and a computer readable storage medium. More specifically, the present disclosure relates to an electronic apparatus serving as a parent node in an Integrated Access and Backhaul (IAB) wireless communication system, an electronic apparatus serving as a child node in an IAB wireless communication system, a wireless communication method performed by a parent node in an IAB wireless communication system, a wireless communication method performed by a child node in an IAB wireless communication system, and a computer readable storage medium.

BACKGROUND

IAB is an important technology adopted in the New Radio (NR) communication system. In an IAB system, a donor node (DN) is connected to another node (including a relay node (RN) and a user equipment (UE)) directly or via one or more RNs. A link, between two RNs or between a RN and a DN, is called as a backhaul (BH) link, and a link, between a UE and a RN or between a UE and a DN, is called as an access (AC) link. In the IAB system, a wireless backhaul link can be adopted, that is, both the BH link and the AC link can be implemented wirelessly. Further, in order to improve indicators such as coverage performance, the number of hops between nodes in the IAB system is not limited. With the complex multi-hop structure, many challenges are introduced in the design of the IAB system.

In the IAB system, all the nodes are required to be able to operate in a half-duplex mode. That is, the nodes in the IAB system can only receive data or transmit data at the same time, indicating that the nodes in the IAB system cannot receive data and transmit data simultaneously. Due to the limitation of the half-duplex mode in the IAB system, how to design a frame structure for each of the links in the IAB system is a new challenge.

In the design of the physical layer of the NR wireless communication system, uplink/downlink configuration at a symbol level is supported. That is, the minimum time granularity of the uplink/downlink configuration in a frame structure is reduced to a symbol. In a time slot, downlink (DL) symbols, uplink (UL) symbols and X symbols (X symbols may be flexibly configured as DL symbols or UL symbols) are included. Different time slot formats have been defined according to the conventional technology. Based on the design of the time slot format, great flexibility can be achieved in the 5G wireless communication system. For example, different ratios between the UL symbols and the DL symbols may be configured according to the features of the data flow in the system. In addition, different subcarrier intervals, such as 15 KHZ, 30 KHZ, 60 KHZ, 120 KHZ, and 240 KHZ, can be adopted in the NR wireless communication system. For systems with different subcarrier intervals, the period of the time slot is different. Different subcarrier intervals are applicable to various scenarios and service flows. Due to the features of the 5G wireless communication system, new challenges are introduced in the design of the frame structure for the IAB system.

Therefore, a technical solution for rationally designing a frame structure for the IAB system based on the features of the 5G wireless communication system is provided.

SUMMARY

A brief summary of the present disclosure is provided hereinafter. The summary is not a comprehensive overview of a full scope or all the features of the present disclosure.

According to the present disclosure, an electronic apparatus, a wireless communication method and a computer readable storage medium are provided to optimize the configuration of the time slot format in the IAB system.

According to an aspect of the present disclosure, an electronic apparatus in an Integrated Access and Backhaul (IAB) system is provided. The electronic apparatus includes processing circuitry. The processing circuitry is configured to: configure, according to a subcarrier interval of a link between the electronic apparatus and a child node of the electronic apparatus, a time slot format cycle for the link, where the time slot format cycle includes a predetermined number of time slots; and configure, for the link, a time slot format of each of the time slots within one time slot format cycle.

According to another aspect of the present disclosure, an electronic apparatus in an Integrated Access and Backhaul (IAB) system is provided. The electronic apparatus includes processing circuitry. The processing circuitry is configured to: receive, from a parent node of the electronic apparatus, a time slot format cycle of a link between the electronic apparatus and the parent node, where the time slot format cycle includes a predetermined number of time slots; receive time slot configuration information from the parent node; and determine, according to the time slot configuration information, a time slot format of each of time slots of the link within one time slot format cycle.

According to another aspect of the present disclosure, a wireless communication method performed by an electronic apparatus in an Integrated Access and Backhaul (IAB) system is provided. The method includes: configuring, according to a subcarrier interval of a link between the electronic apparatus and a child node of the electronic apparatus, a time slot format cycle for the link, where the time slot format cycle includes a predetermined number of time slots; and configuring, for the link, a time slot format of each of the time slots within one time slot format cycle.

According to another aspect of the present disclosure, a wireless communication method performed by an electronic apparatus in an Integrated Access and Backhaul (IAB) system is provided. The method includes: receiving, from a parent node of the electronic apparatus, a time slot format cycle of a link between the electronic apparatus and the parent node, where the time slot format cycle includes a predetermined number of time slots; receiving time slot configuration information from the parent node; and determining, according to the time slot configuration information, a time slot format of each of time slots of the link within one time slot format cycle.

According to another aspect of the present disclosure, a computer readable storage medium is provided. The computer readable storage medium stores computer-executable instructions. The computer-executable instructions, when executed by a computer, cause the computer to perform the wireless communication method according to the present disclosure.

With the electronic apparatus, the wireless communication method and the computer readable storage medium according to the present disclosure, the parent node in the IAB system can configure a time slot format cycle and a time slot format for a link according to a subcarrier interval of the link, thereby optimizing the configuration of the time slot format in the IAB system.

Further areas of applicability will become apparent from the description provided herein. Descriptions and examples in this summary are only schematic and are not intended to limit the scope of the present disclosure.

BRIEF DESCRIPTION OF THE DRAWINGS

The drawings described herein only illustrate the selected embodiments, rather than all embodiments. The drawings are not intended to limit the scope of the present disclosure. In the drawings.

Figure 1:
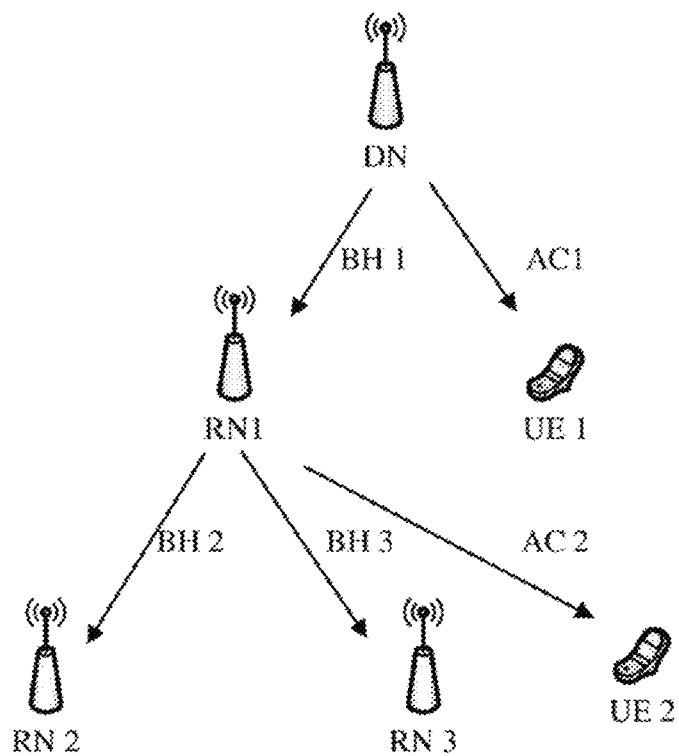
FIG. 1 is a schematic structural diagram of an IAB system according to an embodiment of the present disclosure.

Although the present disclosure may be susceptible to various modifications and alternative forms, specific embodiments thereof have been shown by way of examples in the drawings and have been described in detail herein. However, it should be understood that the description of specific embodiments herein is not intended to limit the present disclosure to the particular forms disclosed, but rather to cover all modifications, equivalents, and alternatives falling within the spirit and scope of the present disclosure. It should be noted that same or similar reference numerals are used throughout the drawings to refer to the same or like parts.

DETAILED DESCRIPTION OF THE EMBODIMENTS

The embodiments of the present disclosure will be described completely in conjunction with the drawings. The following description is only exemplary, and is not intended to limit the present disclosure, and applications or usages thereof.

Exemplary embodiments are provided so that the present disclosure will be thorough and complete, and will fully convey the scope of the present disclosure to those skilled in the art. Numerous specific details, such as examples of specific components, devices, and methods, are described to provide a detailed understanding of the embodiments of the present disclosure. It is apparent for those skilled in the art that the exemplary embodiments may be implemented in many different forms without specific details, and should not be construed to limit the scope of the present disclosure. In some exemplary embodiments, well-known processes, well-known structures, and well-known technologies are not described in detail.

FIG. 1 is a schematic structural diagram of an IAB system according to an embodiment of the present disclosure. The IAB wireless communication system may include multiple nodes, including one DN, one or more RNs, and one or more UEs. In the IAB system, all nodes may be located within a coverage region of the DN. The DN may directly communicate with the RN or the UE, or may communicate with the RN or the UE via one or more RNs. A link, between a RN and a DN or between two RNs, is called as a BH link, and a link, between a UE and a DN or between a UE and a RN is called as an AC link. For any link in the IAB system, a node at one end of the link and close to the DN may be called as a parent node, and a node at the other end of the link may be called as a child node. In the IAB system, each node except the DN has a unique parent node. A node in the IAB system may have no child nodes, one child node, or multiple child nodes. That is, in the IAB system, the parent node may be a DN or a RN, and the child node may be a RN or a UE.

As shown in FIG. 1, the IAB wireless communication system includes one DN, three RNs (RN1, RN2, and RN3), and two UEs (UE1 and UE2). DN directly communicates with RN1 via a BH1 link; DN directly communicates with UE1 via an AC1 link; DN communicates with RN2 via RN1, the BH1 link and a BH2 link; DN communicates with RN3 via RN1, the BH1 link and a BH3 link; and DN communicates with UE2 via RN1, the BH1 link and an AC2 link. In the embodiment shown in FIG. 1, RN1 and UE1 may be called as child nodes of DN, and DN may be called as a parent node of RN1 and UE1. Similarly, RN2, RN3 and UE2 may be called as child nodes of RN1, and RN1 may be called as a parent node of RN2, RN3 and UE2.

As described above, the structure of the IAB system is illustrated according to the embodiment shown in FIG. 1. Since both the BH link and the AC link in the IAB system are implemented wirelessly, the IAB system is called as an IAB wireless communication system in the present disclosure. In addition, since the IAB system is adopted in the 5G NR communication system, the embodiments of the present disclosure can be applied to the 5G NR communication system.

The DN according to the present disclosure may be an apparatus at the network side, such as any type of Transmitting and Receiving Point (TRP) or a base station device (such as an eNB or a gNB).

The RN according to the present disclosure may be an apparatus at the network side, such as a TRP or a device at the network side having certain functions of a base station device, where the certain functions include but not limited to receiving data from a UE and a DN, transmitting data to a UE and a DN, and configuring certain parameters for a UE. That is, the RN may be a device at the network side, which is arranged within a coverage region of the DN and has certain functions of a base station device.

The UE according to the present disclosure may be a mobile terminal (such as a smart phone, a tablet personal computer (PC), a notebook PC, a portable game terminal, a portable/dongle type mobile router, and a digital camera device), or an in-vehicle terminal (such as a car navigation device). The user equipment may also be implemented as a terminal (which is also called as a machine type communication (MTC) terminal) that performs machine-to-machine (M2M) communication. Furthermore, the user equipment may be a wireless communication module (such as an integrated circuit module including a single die) mounted on each of the terminals.

Figure 2:
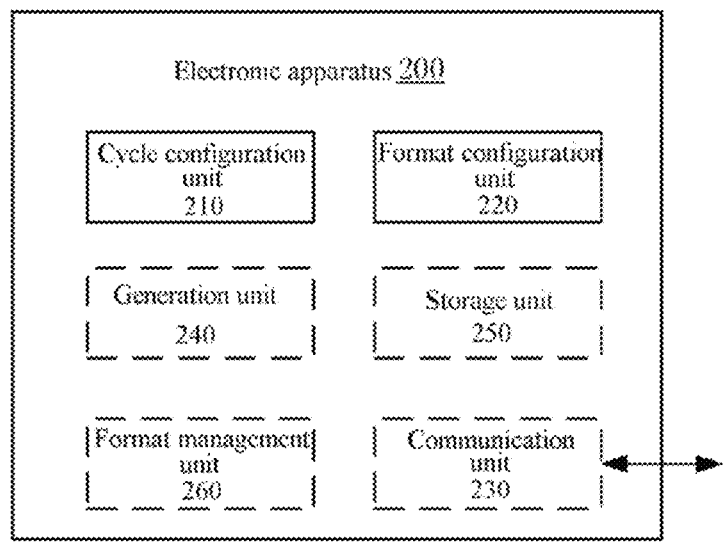
FIG. 2 is a block diagram showing an example of a configuration of an electronic apparatus according to an embodiment of the present disclosure.

FIG. 2 is a block diagram showing an example of a configuration of an electronic apparatus 200 according to an embodiment of the present disclosure. The electronic apparatus 200 may serve as a parent node on any link in the IAB wireless communication system. The electronic apparatus 200 may serve as a DN or a RN in the IAB wireless communication system.

As shown in FIG. 2, the electronic apparatus 200 may include a cycle configuration unit 210 and a format configuration unit 220.

All the units of the electronic apparatus 200 may be included in processing circuitry. It should be noted that the electronic apparatus 200 may include one processing circuitry or multiple processing circuitry. Further, the processing circuitry may include various discrete functional units to perform various functions and/or operations. It should be noted that the functional units may be physical entities or logical entities, and units with different titles may be implemented by the same physical entity.

According to an embodiment of the present disclosure, the cycle configuration unit 210 may configure, according to a subcarrier interval of a link between the electronic apparatus 200 and a child node of the electronic apparatus, a time slot format cycle for the link. The time slot format cycle includes a predetermined number of time slots.

According to the embodiment of the present disclosure, the cycle configuration unit 210 may, during a child node initially accesses the IAB system, configure the time slot format cycle for the link between the electronic apparatus 200 and the child node. During the child node initially accesses the IAB system, a parent node of the child node may be determined. The parent node may determine the subcarrier interval of the link between the parent node and the child node and indicate the subcarrier interval to the child node through system information, which is not described in detail in the present disclosure. In addition, since the electronic apparatus 200 may have one child node or multiple child nodes, the cycle configuration unit 210 may configure a time slot format cycle for a link between the electronic apparatus 200 and each of the child nodes. In the present disclosure, the time slot format cycle may indicate a cycle within which a time slot format is configured. Taking the time slot format cycle of two time slots as an example, the time slot format is configured within a cycle of two time slots.

According to an embodiment of the present disclosure, the format configuration unit 220 may further configure, for the link between the electronic apparatus 200 and the child node, a time slot format of each of the time slots within one time slot format cycle.

That is, the format configuration unit 220 may configure the time slot format for the link within a period of a time slot format cycle. Still taking the time slot format cycle of two time slots as an example, the format configuration unit 220 may configure the time slot formats of a first time slot and a second time slot before the first time slot, configure the time slot formats of a third time slot and a fourth time slot before the third time slot, and configure the time slot formats of a fifth time slot and a sixth time slot before the fifth time slot. If the time slot formats of the third time slot and the fourth time slot are the same as the time slot formats of the first time slot and the second time slot respectively, the configuration of the time slot formats of the third time slot and the fourth time slot may be omitted. Similarly, since the electronic apparatus 200 may have one child node or multiple child nodes, the format configuration unit 220 may configure a time slot format for a link between the electronic apparatus 200 and each of the child nodes.

It is known that, in a case of using a normal Cyclic Prefix (CP), each of the time slots includes 14 OFDM symbols; and in a case of using an extended CP, each of the time slots includes 12 OFDM symbols. For convenience of explanation, only the case in which each of the time slots includes 14 OFDM symbols is taken as an example for description in the present disclosure. According to an embodiment of the present disclosure, the time slot format of each of the time slots may include uplink/downlink configuration information of each of the 14 OFDM symbols included in the time slot, indicating whether each of the 14 OFDM symbols is a DL symbol, a UL symbol or an X symbol. Thus, the format configuration unit 220 may configure the time slot format of each of the time slots within one time slot format cycle for the link, that is, the format configuration unit 220 may configure the type (DL, UL, or X) of each of the OFDM symbols for the link within one slot format cycle.

Therefore, the electronic apparatus 200 according to the present disclosure may configure a time slot format cycle and a time slot format for a link according to a subcarrier interval of the link, thereby optimizing the configuration of the time slot format in the IAB system.

In the 5G NR communication system, different links are allowed to have different subcarrier intervals. The subcarrier interval may be configured as $15 \times 2^\mu$ KHZ, where $\mu$ represents a non-negative integer. For example, if $\mu$ is respectively set to 0, 1, 2, 3, and 4, the subcarrier interval is respectively equal to 15 KHZ, 30 KHZ, 60 KHZ, 120 KHZ, and 240 KHZ. Further, for different subcarrier intervals, one time slot includes 14 OFDM symbols, and each of the OFDM symbols has a different length in time domain. That is, for links with different subcarrier intervals, each of the time slots has a different length in the time domain.

Figure 3:
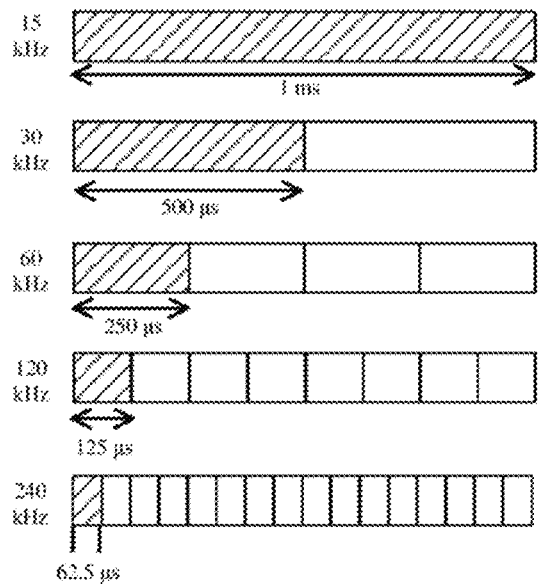
FIG. 3 is a schematic diagram showing a relationship between a subcarrier interval and a length of a time slot in an NR communication system according to an embodiment of the present disclosure.

FIG. 3 is a schematic diagram showing a relationship between a subcarrier interval and a length of a time slot in an NR communication system according to an embodiment of the present disclosure. FIG. 3 shows a length of a time slot in the time domain in cases that $\mu$ is respectively set to 0, 1, 2, 3, and 4. In FIG. 3, the shaded portion represents a length of a time slot. As shown in FIG. 3, in a case that $\mu$ is set to 0 (the subcarrier interval is equal to 15 KHZ), the length of a time slot in the time domain is equal to 1 ms, that is, a subframe having a length of 1 ms includes one time slot; in a case that $\mu$ is set to 1 (the subcarrier interval is equal to 30 KHZ), the length of a time slot in the time domain is equal to 500 µs, that is, the subframe having a length of 1 ms includes two time slots; in a case that $\mu$ is set to 2 (the subcarrier interval is equal to 60 KHZ), the length of a time slot in the time domain is equal to 250 µs, that is, the subframe having a length of 1 ms includes four time slots; in a case that $\mu$ is set to 3 (the subcarrier interval is equal to 120 KHZ), the length of a time slot in the time domain is equal to 125 µs, that is, the subframe having a length of 1 ms includes eight time slots; and in a case that $\mu$ is set to 4 (the subcarrier interval is equal to 240 KHZ), the length of a time slot in the time domain is equal to 62.5 µs, that is, the subframe having a length of 1 ms includes sixteen time slots. Therefore, a greater subcarrier interval indicates that a time slot has a shorter length in the time domain and the subframe having a length of 1 ms includes more time slots.

According to an embodiment of the present disclosure, the cycle configuration unit 210 may configure a time slot format cycle for a link such that the subcarrier interval of the link is proportional to the number of the time slots included in the time slot format cycle. That is, a greater subcarrier interval of the link indicates that a greater number of time slots are included in one time slot format cycle of the link.

According to an embodiment of the present disclosure, the cycle configuration unit 210 may configure the length of the time slot format cycle of the link in the time domain to be equal to a length of a time slot format cycle of a link between the electronic apparatus 200 and a parent node of the electronic apparatus 200 in the time domain, or equal to a length of a time slot format cycle of a link between the electronic apparatus 200 and another child node of the electronic apparatus 200 in the time domain.

According to an embodiment of the present disclosure, the time slot format cycle for each of the links in the IAB system may have the same length in the time domain. In an embodiment, the length of the time slot format cycle in the time domain may be equal to a multiple of the length (1 ms) of a subframe. In another embodiment, the length of the time slot format cycle in the time domain may be equal to the length of a subframe, that is, 1 ms.

Figure 4:
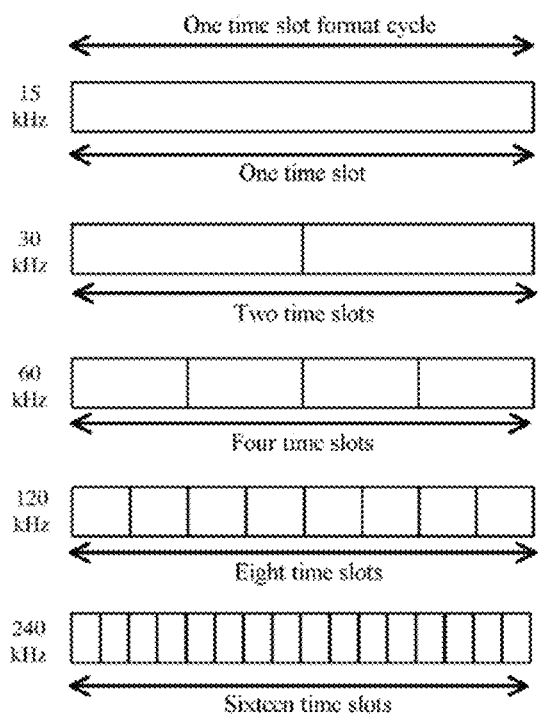
FIG. 4 is a schematic diagram showing a relationship between a subcarrier interval and a time slot format cycle according to an embodiment of the present disclosure.

FIG. 4 is a schematic diagram showing a relationship between a subcarrier interval and a time slot format cycle according to an embodiment of the present disclosure. According to the embodiment shown in FIG. 4, the length of the time slot format cycle in the time domain may be equal to the length of a subframe, that is, 1 ms. As shown in FIG. 4, in a case that the subcarrier interval is equal to 15 KHZ, the subframe having a length of 1 ms includes one time slot, thus the time slot format cycle is equal to 1; in a case that the subcarrier interval is equal to 30 KHZ, the subframe having a length of 1 ms includes two time slots, thus the time slot format cycle is equal to 2; in a case that the subcarrier interval is equal to 60 KHZ, the subframe having a length of 1 ms includes four time slot, thus the time slot format cycle is equal to 4; in a case that the subcarrier interval is equal to 120 KHZ, the subframe having a length of 1 ms includes eight time slots, thus the time slot format cycle is equal to 8; and in a case that the subcarrier interval is equal to 240 KHZ, the subframe having a length of 1 ms includes sixteen time slots, thus the time slot format cycle is equal to 16. That is, in cases that $\mu$ is respectively set to 0, 1, 2, 3, and 4, the cycle configuration unit 210 may respectively configure the time slot format cycle as 1, 2, 4, 8, and 16.

As shown in FIG. 2, the electronic apparatus 200 may further include a communication unit 230. The communication unit 230 is configured to transmit and receive information.

According to an embodiment of the present disclosure, the electronic apparatus 200 may periodically transmit the time slot format cycle to the child node by using the communication unit 230. For example, the electronic apparatus 200 may transmit the time slot format cycle through high layer signaling. The high level signaling includes but is not limited to RRC signaling. Table 1 shows a non-limiting example of a field of slotformat_cycle indicating the time slot format cycle which is added in the RRC signaling, and a value of the field.

TABLE 1

| Field | Value |
|---|---|
| slotformat_cycle | {1, 2, 4, 8, 16} |

For example, the electronic apparatus 200 may add the following codes in the RRC signaling of UL-DL-Configuration-common, UL-DL-Configuration-common-set2, and UL-DL-Configuration-dedicate:

```
TDD-UL-DL-SlotConfig::=    SEQUENCE{
    slotIndex              TDD-UL-DL-SlotIndex,
    slotformatcycle        ENUMERATED {1,2,4,8,16}
    symbols                CHOICE {
        allDownlink            NULL,
        allUplink              NULL,
        explicit               SEQUENCE}
```

```
        nrofDownlinkSymbols    INTEGER
(1..maxNrofSymbols-1)
        nrofUplinkSymbols      INTEGER (1..maxNrofSymbols-1)
            }
         }
}
```

As described above, the cycle configuration unit 210 may configure the time slot format cycle for the link between the electronic apparatus 200 and the child node of the electronic apparatus 200. Further, the cycle configuration unit 210 may transmit the configured time slot format cycle to the format configuration unit 220, so that the format configuration unit 220 can configure, according to the time slot format cycle, the time slot format of each of the time slots within the time slot format cycle. The operations by the format configuration unit 220 are described in detail below.

Figure 5:
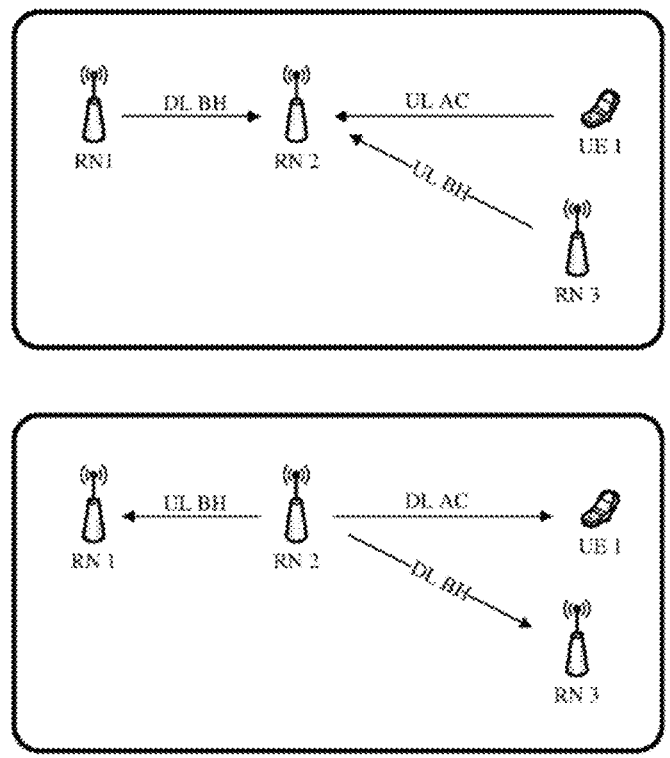
FIG. 5 is a schematic diagram of information flows in cases that a RN receives information and the RN transmits information according to an embodiment of the present disclosure.

FIG. 5 is a schematic diagram of information flows in cases that a RN receives information and the RN transmits information according to an embodiment of the present disclosure.

The upper part of FIG. 5 is a schematic diagram of information flows in a case that a RN receives information. Taking RN2 as an example, RN2 cannot transmit information when receiving information. RN2 may receive information from RN3, UE1, and RN1. The direction of the BH link between RN2 and RN3 is uplink, the direction of the AC link between RN2 and UE1 is uplink, and the direction of the BH link between RN2 and RN1 is downlink. Similarly, the lower part of FIG. 5 is a schematic diagram of information flows in a case that the RN transmits information. RN2 cannot receive information when transmitting information. RN2 may transmit information to RN3, UE1, and RN1. The direction of the BH link between RN2 and RN3 is downlink, the direction of the AC link between RN2 and UE1 is downlink, and the direction of the BH link between RN2 and RN1 is uplink. Therefore, at the same time, a direction of a link between a node and a parent node of the node is opposite to a direction of a link between the node and a child node of the node. Further, if the node has multiple child nodes, links between the node and the multiple child nodes have the same direction.

According to an embodiment of the present disclosure, the format configuration unit 220 may configure the time slot format for the link between the electronic apparatus 200 and the child node of the electronic apparatus 200, to cause uplink/downlink configuration of each of symbols within the time slot format cycle to be opposite to uplink/downlink configuration of a corresponding symbol within the time slot format cycle of the link between the electronic apparatus 200 and a parent node of the electronic apparatus 200, or to be the same as uplink/downlink configuration of a corresponding symbol within the time slot format cycle of the link between the electronic apparatus 200 and another child node of the electronic apparatus 200.

According to the embodiment of the present disclosure, in a case that the electronic apparatus 200 is a RN, the electronic apparatus 200 has a parent node, thus the format configuration unit 220 may configure the time slot format for the link between the electronic apparatus 200 and the child node of the electronic apparatus 200, to cause the uplink/downlink configuration of each of the symbols within the time slot format cycle to be opposite to the uplink/downlink configuration of the corresponding symbol within the time slot format cycle of the link between the electronic apparatus 200 and the parent node of the electronic apparatus 200. That is, for a symbol, if the uplink/downlink configuration of the link between the electronic apparatus 200 and the parent node of the electronic apparatus 200 is UL, the uplink/downlink configuration of the link between the electronic apparatus 200 and the child node is configured as DL; if the uplink/downlink configuration of the link between the electronic apparatus 200 and the parent node of the electronic apparatus 200 is DL, the uplink/downlink configuration of the link between the electronic apparatus 200 and the child node is configured as UL; and if the uplink/downlink configuration of the link between the electronic apparatus 200 and the parent node of the electronic apparatus 200 is XL, the uplink/downlink configuration of the link between the electronic apparatus 200 and the child node is configured as X.

According to the embodiment of the present disclosure, in a case that the electronic apparatus 200 is a DN, the electronic apparatus 200 has no parent node, thus the format configuration unit 220 may configure the time slot format for the link between the electronic apparatus 200 and the child node of the electronic apparatus 200, to cause the uplink/downlink configuration of each of the symbols within the time slot format cycle to be the same as the uplink/downlink configuration of the corresponding symbol within the time slot format cycle of the link between the electronic apparatus 200 and another child node of the electronic apparatus 200. That is, for a symbol, if the uplink/downlink configuration of the link between the electronic apparatus 200 and another child node of the electronic apparatus 200 is UL, DL, or X, the uplink/downlink configuration of the link between the electronic apparatus 200 and the child node is configured as UL, DL, or X respectively. The format configuration unit 220 may configure a time slot format for each of the links between the electronic apparatus 200 and all the child nodes, so that all the links have the same uplink/downlink configuration.

Figure 6:
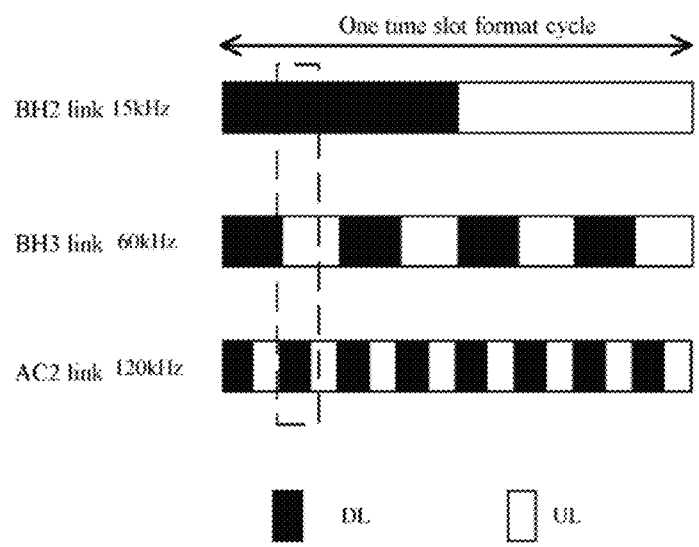
FIG. 6 is a schematic diagram showing a limitation of a half-duplex mode to the design of a time slot format in an IAB system.

FIG. 6 is a schematic diagram showing a limitation of a half-duplex mode to the design of a time slot format in an IAB system. As shown in FIG. 6, it is assumed that the subcarrier interval of the BH2 link shown in FIG. 1 is 15 KHZ, the subcarrier interval of the BH3 link shown in FIG. 1 is 60 KHZ, and the subcarrier interval of the AC2 link shown in FIG. 1 is 120 KHZ, and all links have the same time slot format in which the first 7 symbols are DL symbols and the last 7 symbols are UL symbols, thus FIG. 6 shows the configurations of the time slot formats of all the links within a subframe having a length of 1 ms. As shown in the dashed box in FIG. 6, at the same time, the directions of the BH2 link and the AC2 link are downlink, indicating that RN1 transmits data; and the direction of the BH3 link is uplink, indicating that RN1 receives data. However, RN1 cannot transmit and receive data simultaneously in the half-duplex mode. Therefore, the time slot format is unreasonable.

Figure 7:
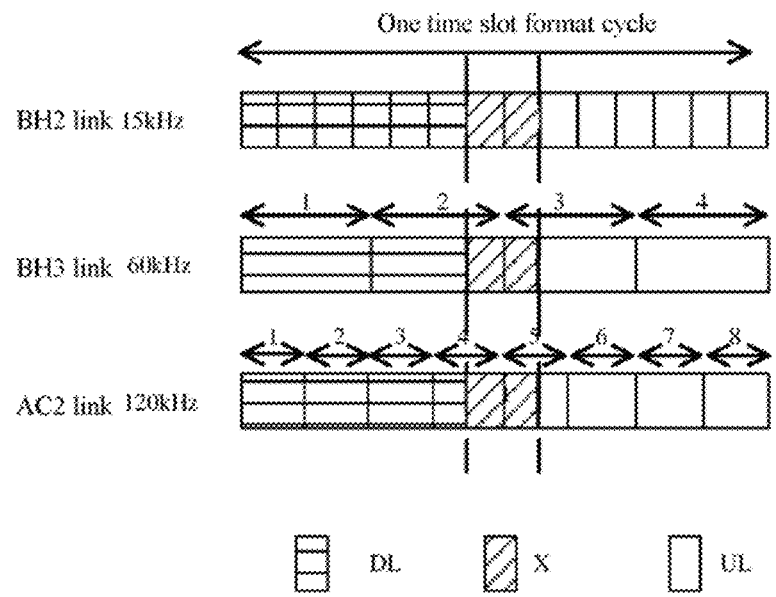
FIG. 7 is a schematic diagram of a design of a time slot format in an IAB system according to an embodiment of the present disclosure.
Figure 8:
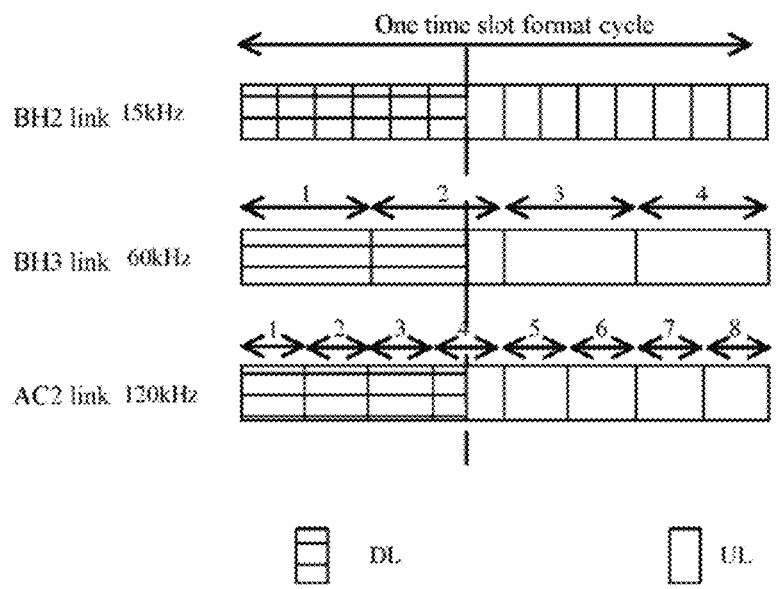
FIG. 8 is a schematic diagram of a design of a time slot format in an IAB system according to an embodiment of the present disclosure.

FIG. 7 and FIG. 8 are schematic diagrams of designs of a time slot format in an IAB system according to embodiments of the present disclosure. In FIG. 7, DL symbols, UL symbols, and X symbols are included. In FIG. 8, only DL symbols and UL symbols are included. As shown in FIG. 7 and FIG. 8, the BH2 link, the BH3 link and the AC2 link have the same direction at any time. Although X symbols having an uncertain uplink/downlink direction are included in FIG. 7, the parent node may notify the child node of the uplink/downlink configuration of the X symbols after the time slot format is configured. The configuration of the X symbols follows a rule for configuring the time slot format, that is, uplink/downlink configuration of a link between a node and a parent node of the node is opposite to uplink/downlink configuration of a link between the node and a child node of the node, and uplink/downlink configuration of links between a node and each of child nodes of the node is the same.

As described above, according to the embodiment of the present disclosure, in the IAB system, the uplink/downlink configuration of the link between a node and the parent node of the node is opposite to the uplink/downlink configuration of the link between the node and the child node of the node, and the uplink/downlink configuration of the links between the node and each of the child nodes of the node is the same. Thus, at any time, the directions of the links between a node and all child nodes of the node are the same, and are opposite to the direction of the link between the node and the parent node of the node, ensuring that the node is either transmitting or receiving information, thereby meeting the requirements of the half-duplex mode of the IAB system.

As shown in FIG. 2, the electronic apparatus 200 may further include a generation unit 240 according to the embodiment of the present disclosure. The generation unit 240 is configured to generate time slot configuration information. The time slot configuration information may indicate information of the time slot format of each of the time slots within one time slot format cycle for the link between the electronic apparatus 200 and the child node of the electronic apparatus 200. Further, the electronic apparatus 200 may transmit the time slot configuration information to the child node via the communication unit 230.

As shown in FIG. 2, the electronic apparatus 200 may further include a format management unit 260 according to the embodiment of the present disclosure. The format management unit 260 is configured to manage the time slot format of each of the links (including the link between the electronic apparatus 200 and the parent node of the electronic apparatus 200, and the links between the electronic apparatus 200 and the child nodes of the electronic apparatus 200) related to the electronic apparatus 200. After the electronic apparatus 200 configures the time slot format for the link between the electronic apparatus 200 and the child node of the electronic apparatus 200, the electronic apparatus 200 may store the time slot format in the format management unit 260 in addition to transmitting the time slot format to the child node. Thus, both the electronic apparatus 200 and the child node of the electronic apparatus 200 know the time slot format of the link between the electronic apparatus 200 and the child node of the electronic apparatus 200, so that the electronic apparatus 200 and the child node of the electronic apparatus 200 can transmit uplink/downlink information according to the time slot format.

According to the embodiment of the present disclosure, the generation unit 240 may generate time slot configuration information such that the time slot configuration information includes identification information of the time slot format of each of the time slots within one time slot format cycle. Taking a time slot format cycle including four time slots as an example, the generation unit 240 may generate the following time slot configuration information: identification information of a time slot format 1, identification information of a time slot format 2, identification information of a slot format 3, and identification information of a time slot format 4.

According to the current 3GPP standard, 56 different time slot formats have been defined, numbered from 0 to 55 respectively. For each of the time slot formats, the types of the 14 symbols included therein, including UL symbols, DL symbols, or X symbols, are respectively defined. For the time slot formats in which the types of the symbols have been defined, except for the time slot format numbered 0 (in which 14 symbols are DL symbols) and the time slot format numbered 1 (in which 14 symbols are UL symbols), each of the remaining time slot formats includes UL symbols, DL symbols and X symbols.

According to an embodiment of the present disclosure, the generation unit 240 may, after the format configuration unit 220 configures the time slot format of each of the time slots, determine whether the time slot format of the time slot is included in the defined 56 time slot formats. If the time slot format of the time slot is included in the defined 56 time slot formats, the generation unit 240 may determine the number of the identification information of the time slot format as the number of the time slot format, ranging from 0 to 55. If the time slot format of the time slot is not included in the defined 56 time slot formats, the generation unit 240 may define the number of the identification information of the time slot format of the time slot as 2. In the time slot format numbered 2, all the 14 symbols are X symbols.

Taking the embodiment shown in FIG. 7 as an example, for the BH2 link, the time slot format cycle includes one time slot, and the time slot format of the time slot is DL, DL, DL, DL, DL, DL, X, X, UL, UL, UL, UL, UL, UL. This time slot format is included in the defined 56 time slot formats, corresponding to number 45. Thus, the generation unit 240 may generate time slot configuration information corresponding to the time slot format 45. Similarly, for the BH3 link, the time slot format of a first time slot is all DLs, and this time slot format is included in the defined 56 time slot formats, corresponding to number 0; the time slot format of a second time slot is DL, DL, DL, DL, DL, DL, DL, DL, DL, DL, X, X, X, X, and this time slot format is included in the defined 56 time slot formats, corresponding to number 6; the time slot format of a third time slot is X, X, X, X, UL, UL, UL, UL, UL, UL, UL, UL, UL, UL, and this time slot format is included in the defined 56 time slot formats, corresponding to number 13; and the time slot format of a fourth time slot is all ULs, and this time slot format is included in the defined 56 time slot formats, corresponding to number 1. Therefore, the generation unit 240 may generate time slot configuration information including numbers 0, 6, 13, and 1, respectively.

According to an embodiment of the present disclosure, the electronic apparatus 200 may further, if the time slot format indicated by the time slot configuration information generated by the generation unit 240 includes an X symbol, transmit information about configuration of the X symbol to the child node. In an embodiment, the electronic apparatus 200 may transmit the information through low layer signaling, including but not limited to DCI. The electronic apparatus 200 may transmit the information about the configuration of the X symbol by using various known means, which is not limited in the present disclosure.

According to the embodiment of the present disclosure, the generated time slot configuration information is simple and clear, compatible with the existing standards, and with minor changes to the existing standards. In addition, in this case, the X symbols are allowed to be included in the time slot format, thereby making the configuration of the time slot more flexible.

According to an embodiment of the present disclosure, in order to save signaling overhead, the time slot configuration information generated by the generation unit 240 may include identification information of each of one or more time slots in which uplink/downlink conversion occurs within one time slot format cycle, and identification information of a time slot format of the time slot.

As shown in FIG. 8, for the BH2 link, uplink/downlink conversion occurs within one time slot format cycle, and the conversion occurs in a first time slot; for the BH3 link, uplink/downlink conversion occurs within one time slot format cycle, and the conversion occurs in a second time slot; and for the AC2 link, uplink/downlink conversion occurs within one time slot format cycle, and the conversion occurs in a fourth time slot. Therefore, as long as the time slot configuration information includes the identification information of the time slot in which the conversion occurs and the time slot format of the time slot, the child node can know the uplink/downlink configuration of each of the symbols within the time slot format cycle. FIG. 8 only shows the situation in which one uplink/downlink conversion occurs within one time slot format cycle. In fact, multiple uplink/downlink conversions may occur within one time slot format cycle. In this case, the time slot configuration information includes identification information of a time slot in which each of the multiple uplink/downlink conversions occurs and a time slot format of each of the time slots.

According to an embodiment of the present disclosure, the communication unit 230 may transmit the identification information of each of the one or more time slots in which uplink/downlink conversion occurs to the child node through high layer signaling, including but not limited to RRC signaling. Table 2 shows a non-limiting example of a field of slotformat_transposition indicating identification information of a time slot in which uplink/downlink conversion occurs and a value of the field, where the field of slotformat_transposition is added in the RRC signaling. Since one slot format cycle includes at most 16 time slots, a maximum value of slotformat_transposition is 16.

TABLE 2

| Field | Value |
| --- | --- |
| slotformat_transposition | {1, 2, . . . , 16} |

In an embodiment, the electronic apparatus 200 may add the following codes in the RRC signaling such as UL-DL-Configuration-common, UL-DL-Configuration-common-set2, and UL-DL-Configuration-dedicate.

```
TDD-UL-DL-SlotConfig::=   SEQUENCE{
    slotIndex               TDD-UL-DL-SlotIndex,
    slotformatcycle         ENUMERATED{1,2,4,8,16}
    slotformattransposition INTEGER(1..16)
    symbols                 CHOICE{
        allDownlink             NULL,
        allUplink               NULL,
        explicit                SEQUENCE{
            nrofDownlinkSymbols     INTEGER
(1..maxNrofSymbols-1)                   OPTIONAL,--
Need S
            nrofUplinkSymbols       INTEGER
(1..maxNrofSymbols-1)                   OPTIONAL --
Need S
        }
    }
}
```

According to an embodiment of the present disclosure, the communication unit 230 may transmit the identification information of the time slot format of each of the one or more time slots in which uplink/downlink conversion occurs to the child node through low layer signaling, including but not limited to DCI.

As described above, according to the current 3GPP standard, 56 different time slot formats have been defined, numbered from 0 to 55 respectively. In transmitting the identification information of the time slot format of the time slot in which the uplink/downlink conversion occurs to the child node, the time slot format may be not included in the 56 time slot formats. Therefore, in order to further save overhead, some new time slot formats are defined according to the present disclosure, and the new time slot formats are numbered, so that the electronic apparatus 200 may only transmit the number of the time slot format in transmitting the identification information of the time slot format of the time slot in which the uplink/downlink conversion occurs to the child node. In addition, for convenience of explanation, that only one uplink/downlink conversion occurs within one time slot format cycle is taken as an example for description below. It should be understood by those skilled in the art that the solutions according to the present disclosure can also be applied to a situation in which multiple uplink/downlink conversions occurs within one time slot format cycle.

Table 3 shows some new time slot formats.

TABLE 3

| Number | Time slot format | | | | | | | | | | | | |
| --- | --- | --- | --- | --- | --- | --- | --- | --- | --- | --- | --- | --- | --- |
| 56 | D | U | U | U | U | U | U | U | U | U | U | U | U | U |
| 57 | D | D | U | U | U | U | U | U | U | U | U | U | U | U |
| 58 | D | D | D | U | U | U | U | U | U | U | U | U | U | U |
| 59 | D | D | D | D | U | U | U | U | U | U | U | U | U | U |
| 60 | D | D | D | D | D | U | U | U | U | U | U | U | U | U |
| 61 | D | D | D | D | D | D | U | U | U | U | U | U | U | U |
| 62 | D | D | D | D | D | D | D | U | U | U | U | U | U | U |
| 63 | D | D | D | D | D | D | D | D | U | U | U | U | U | U |
| 64 | D | D | D | D | D | D | D | D | D | U | U | U | U | U |
| 65 | D | D | D | D | D | D | D | D | D | D | U | U | U | U |
| 66 | D | D | D | D | D | D | D | D | D | D | D | U | U | U |
| 67 | D | D | D | D | D | D | D | D | D | D | D | D | U | U |
| 68 | D | D | D | D | D | D | D | D | D | D | D | D | D | U |

It can be seen that 13 new time slot formats are defined in Table 3, numbered from 56 to 68. In the time slot formats, DL symbols are arranged in the front, UL symbols are arranged in the back, and the number of the DL symbols is set to 1 to 13, respectively. Therefore, the electronic apparatus 200 may directly transmit the number of the time slot format in transmitting the identification information of the time slot format of the time slot in which the uplink/downlink conversion occurs to the child node of the electronic apparatus 200.

According to the embodiment of the present disclosure, as shown in FIG. 2, the electronic apparatus 200 may further include a storage unit 250. The storage unit 250 is configured to store a correspondence between the time slot formats newly defined according to the present disclosure and the numbers.

In addition, as mentioned above, the format configuration unit 220 may configure the uplink/downlink configuration of the link between the electronic apparatus 200 and the child node to be the same as the uplink/downlink configuration of the link between the electronic apparatus 200 and another child node. In order to further simplify the calculation performed by the format configuration unit 220, a mapping table may be generated according to an embodiment of the present disclosure to map the number of the time slot in which uplink/downlink conversion occurs at different subcarriers and the number of the time slot format of the time slot. Thus, the format configuration unit 220 may determine, according to the number of the time slot in which uplink/downlink conversion occurs of the configured link between the electronic apparatus 200 and the child node and the number of the time slot format of the time slot, the number of a time slot in which uplink/downlink conversion occurs of a to-be-configured link and the number of a time slot format of the time slot.

According to the embodiment of the present disclosure, for different subcarrier intervals, the number of the time slots included in one time slot format cycles is different, thus the number of the DL symbols included in the time slot format cycle is different. Table 4 shows the number of the DL symbols included in one time slot format cycle for each of the newly added time slot formats for different subcarrier intervals.

TABLE 4

| Number of time slot format in case of $\mu = 0$ | $\mu = 0$ | $\mu = 1$ | $\mu = 2$ | $\mu = 3$ | $\mu = 4$ |
|---|---|---|---|---|---|
| 56 | 1 | 2 | 4 | 8 | 16 |
| 57 | 2 | 4 | 8 | 16 | 32 |
| 58 | 3 | 6 | 12 | 24 | 48 |
| 59 | 4 | 8 | 16 | 32 | 64 |
| 60 | 5 | 10 | 20 | 40 | 80 |
| 61 | 6 | 12 | 24 | 48 | 96 |
| 62 | 7 | 14 | 28 | 56 | 112 |
| 63 | 8 | 16 | 32 | 64 | 128 |
| 64 | 9 | 18 | 36 | 72 | 144 |
| 65 | 10 | 20 | 40 | 80 | 160 |
| 66 | 11 | 22 | 44 | 88 | 176 |
| 67 | 12 | 24 | 48 | 96 | 192 |
| 68 | 13 | 26 | 52 | 104 | 208 |

As shown in Table 4, in a case that $\mu$ is equal to 0, one time slot format cycle includes one time slot, thus the number of the DL symbols included in the time slot format cycle is equal to the number of the DL symbols included in the time slot format of the time slot; in a case that $\mu$ is equal to 1, one time slot format cycle includes two time slots, thus the number of the DL symbols included in the time slot format cycle is equal to twice the number of the DL symbols included in the time slot format of the time slot; and so on.

According to the embodiment of the present disclosure, the number of the DL symbols included in one time slot format cycle shown in Table 4 is divided by 14 to obtain a remainder, then the obtained quotient is added by one to obtain the number of the time slot in which uplink/downlink conversion occurs, and the obtained remainder is equal to the number of the DL symbols included in the time slot in which uplink/downlink conversion occurs. Table 5 shows the number of the DL symbols included in the time slot in which uplink/downlink conversion occurs for different subcarrier intervals and different time slot format numbers.

TABLE 5

| Number of time slot format in case of $\mu = 0$ | $\mu = 0$ | $\mu = 1$ | $\mu = 2$ | $\mu = 3$ | $\mu = 4$ |
|---|---|---|---|---|---|
| 56 | 1 | 2 | 4 | 8 | 2 |
| 57 | 2 | 4 | 8 | 2 | 4 |
| 58 | 3 | 6 | 12 | 10 | 6 |
| 59 | 4 | 8 | 2 | 4 | 8 |
| 60 | 5 | 10 | 6 | 12 | 10 |
| 61 | 6 | 12 | 10 | 6 | 12 |
| 62 | 7 | 0 | 0 | 0 | 0 |
| 63 | 8 | 2 | 4 | 8 | 2 |
| 64 | 9 | 4 | 8 | 2 | 4 |
| 65 | 10 | 6 | 12 | 10 | 6 |
| 66 | 11 | 8 | 2 | 4 | 8 |
| 67 | 12 | 10 | 6 | 12 | 10 |
| 68 | 13 | 12 | 10 | 6 | 12 |

According to the number of the DL symbols included in the time slot in which uplink/downlink conversion occurs, the number of the time slot in which uplink/downlink conversion occurs shown in Table 3 can be determined. For example, in a case that $\mu$ is equal to 0, the number of the DL symbols in the time slot in which uplink/downlink conversion occurs is 1, corresponding to the time slot format numbered 56 in Table 3; in a case that $\mu$ is equal to 1, the number of the DL symbols in the time slot in which uplink/downlink conversion occurs is 2, corresponding to the time slot format numbered 57 in Table 3; in a case that $\mu$ is equal to 2, the number of the DL symbols in the time slot in which uplink/downlink conversion occurs is 4, corresponding to the time slot format numbered 59 in Table 3; and so on. Thus, Table 6 can be determined. Table 6 shows a mapping relationship between the number of the time slot in which uplink/downlink conversion occurs and the number of the time slot format of the time slot at different subcarriers, where "None" indicates that there is no time slot in which uplink/downlink conversion occurs.

TABLE 6

| $\mu = 0$ | | $\mu = 1$ | | $\mu = 2$ | | $\mu = 3$ | | $\mu = 4$ | |
|---|---|---|---|---|---|---|---|---|---|
| time slot number | time slot format number | time slot number | time slot format number | time slot number | time slot format number | time slot number | time slot format number | time slot number | time slot format number |
| 1 | 56 | 1 | 57 | 1 | 59 | 1 | 63 | 2 | 57 |
| 1 | 57 | 1 | 59 | 1 | 63 | 2 | 57 | 3 | 59 |
| 1 | 58 | 1 | 61 | 1 | 67 | 2 | 65 | 4 | 61 |
| 1 | 59 | 1 | 63 | 2 | 57 | 3 | 59 | 5 | 63 |
| 1 | 60 | 1 | 65 | 2 | 61 | 3 | 67 | 6 | 65 |
| 1 | 61 | 1 | 67 | 2 | 65 | 4 | 61 | 7 | 67 |
| 1 | 62 | None | None | None | None | None | None | None | None |
| 1 | 63 | 2 | 57 | 3 | 59 | 5 | 63 | 10 | 57 |
| 1 | 64 | 2 | 59 | 3 | 63 | 6 | 57 | 11 | 59 |
| 1 | 65 | 2 | 61 | 3 | 67 | 6 | 65 | 12 | 61 |
| 1 | 66 | 2 | 63 | 4 | 57 | 7 | 59 | 13 | 63 |
| 1 | 67 | 2 | 65 | 4 | 61 | 7 | 67 | 14 | 65 |
| 1 | 68 | 2 | 67 | 4 | 65 | 8 | 61 | 15 | 67 |

As shown in Table 6, the time slot number represents the number of the time slot in which uplink/downlink conversion occurs, and the time slot format number represents the number of the time slot format of the time slot in which uplink/downlink conversion occurs. For example, in a case that μ is equal to 0, the time slot number is 1 and the time slot format number is 56, it indicates that uplink/downlink conversion occurs in a first time slot and the time slot format of the time slot is the time slot format numbered 56 shown in Table 3. In a case that μ is equal to 1, uplink/downlink conversion occurs in a first time slot and the time slot format of the time slot is the time slot format numbered 57 shown in Table 3.

According to an embodiment of the present disclosure, the storage unit 250 may store, for example, in the case that the DL symbols are arranged in the front, the mapping relationship between the number of the time slot in which uplink/downlink conversion occurs and the number of the time slot format of the time slot for different subcarriers as shown in Table 6. Thus, the format configuration unit 220 may configure the time slot format for other links according to the time slot format of the configured link and the mapping relationship stored in the storage unit 250.

The embodiment shown in FIG. 8 is taken as an example. Assuming that RN1 has configured the time slot format of each of the time slots within one time slot format cycle for the BH2 link, it is required to configure a time slot format for the BH3 link and the AC2 link according to the time slot format of the BH2 link. As shown in FIG. 8, for the BH2 link, in a case that μ is equal to 0, the number of the time slot in which uplink/downlink conversion occurs is 1, and the number of the time slot format of the time slot is 61. According to Table 6, for the BH3 link, it can be determined that in the case that μ is equal to 2, the number of the time slot in which uplink/downlink conversion occurs is 2, and the number of the time slot format of the time slot is 65; and for the AC2 link, in the case that μ is equal to 3, the number of the time slot in which uplink/downlink conversion occurs is 4, and the number of the time slot format of the time slot is 61.

In the newly added time slot formats shown in FIG. 3, the DL symbols are arranged in the front, and the UL symbols are arranged in the back. Similarly, according to the embodiment of the present disclosure, some new time slot formats in which the UL symbols are arranged in the front and the DL symbols are arranged in the back may be added, as shown in Table 7.

TABLE 7

| Number | Time slot format |
|---|---|
| 69 | U D D D D D D D D D D D D D |
| 70 | U U D D D D D D D D D D D D |
| 71 | U U U D D D D D D D D D D D |
| 72 | U U U U D D D D D D D D D D |
| 73 | U U U U U D D D D D D D D D |
| 74 | U U U U U U D D D D D D D D |
| 75 | U U U U U U U D D D D D D D |
| 76 | U U U U U U U U D D D D D D |
| 77 | U U U U U U U U U D D D D D |
| 78 | U U U U U U U U U U D D D D |
| 79 | U U U U U U U U U U U D D D |
| 80 | U U U U U U U U U U U U D D |
| 81 | U U U U U U U U U U U U U D |

As shown in Table 7, 13 new time slot formats are defined, numbered from 69 to 81. In the time slot formats, UL symbols are arranged in the front, DL symbols are arranged in the back, and the number of the UL symbols is set to 1 to 13, respectively. Therefore, the electronic apparatus 200 may directly transmit the number of the time slot format in transmitting the identification information of the time slot format of the time slot in which the uplink/downlink conversion occurs to the child node of the electronic apparatus 200. Similarly, the storage unit 250 may be configured to store the newly added time slot formats.

Further, according to the embodiments of the present disclosure, a mapping relationship, in the case that the UL symbols are arranged in the front, between the number of the time slot in which uplink/downlink conversion occurs and the number of the time slot format of the time slot for different subcarriers may be determined in a similar way as described above. The mapping relationship is shown in Table 8.

TABLE 8

| μ = 0 | | μ = 1 | | μ = 2 | | μ = 3 | | μ = 4 | |
|---|---|---|---|---|---|---|---|---|---|
| time slot number | time slot format number | time slot number | time slot format number | time slot number | time slot format number | time slot number | time slot format number | time slot number | time slot format number |
| 1 | 69 | 1 | 70 | 1 | 72 | 1 | 76 | 2 | 70 |
| 1 | 70 | 1 | 72 | 1 | 76 | 2 | 70 | 3 | 72 |
| 1 | 71 | 1 | 74 | 1 | 80 | 2 | 78 | 4 | 74 |
| 1 | 72 | 1 | 76 | 2 | 70 | 3 | 72 | 5 | 76 |
| 1 | 73 | 1 | 78 | 2 | 74 | 3 | 80 | 6 | 78 |
| 1 | 74 | 1 | 80 | 2 | 78 | 4 | 74 | 7 | 80 |
| 1 | 75 | None | None | None | None | None | None | None | None |
| 1 | 76 | 2 | 70 | 3 | 72 | 5 | 76 | 10 | 70 |
| 1 | 77 | 2 | 72 | 3 | 76 | 6 | 70 | 11 | 72 |
| 1 | 78 | 2 | 74 | 3 | 80 | 6 | 78 | 12 | 74 |
| 1 | 79 | 2 | 76 | 4 | 70 | 7 | 72 | 13 | 76 |
| 1 | 80 | 2 | 78 | 4 | 74 | 7 | 80 | 14 | 78 |
| 1 | 81 | 2 | 80 | 4 | 78 | 8 | 74 | 15 | 80 |

According to an embodiment of the present disclosure, the storage unit 250 may store, for example, in the case that the UL symbols are arranged in the front, the mapping relationship between the number of the time slot in which uplink/downlink conversion occurs and the number of the time slot format of the time slot for different subcarriers as shown in Table 8. Thus, the format configuration unit 220 may configure the time slot format for other links according to the time slot format of the configured link and the mapping relationship stored in the storage unit 250. The process is similar to the previous process in the case that the DL symbols are arranged in the front, and is not repeated herein.

According to an embodiment of the present disclosure, the generated time slot configuration information may only include the number of the time slot in which uplink/downlink conversion occurs and the number of the time slot format of the time slot, thereby saving signaling overhead. Furthermore, in this case, the time slot format does not include an X symbol, thereby avoiding subsequent signaling overhead for indicating the direction of the X symbol.

Figure 9:
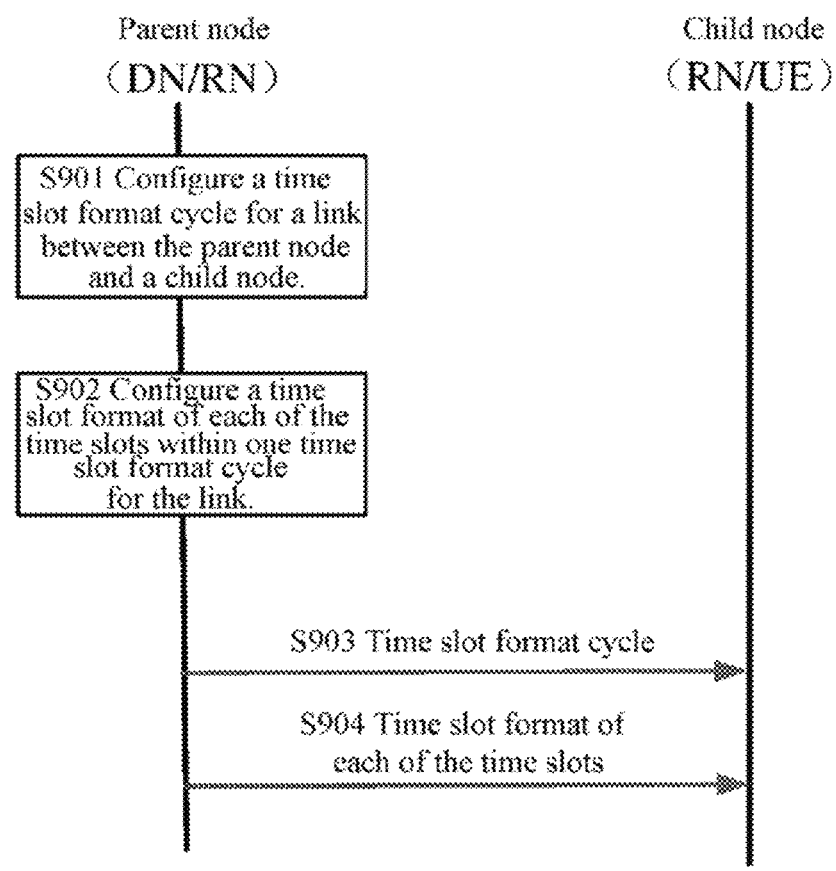
FIG. 9 is a signaling flow chart of configuring, by a parent node, a time slot format cycle and a time slot format for a link according to an embodiment of the present disclosure.

FIG. 9 is a signaling flow chart of configuring, by a parent node, a time slot format cycle and a time slot format for a child node according to an embodiment of the present disclosure. As shown in FIG. 9, in step S901, a parent node configures a time slot format cycle for a link between the parent node and a child node. In step S902, the parent node configures a time slot format of each of the time slots within one time slot format cycle for the link. In step S903, the parent node periodically transmits the time slot format cycle of the link to the child node. In step S904, the parent node transmits the time slot format of each of the time slots within one time slot format cycle of the link to the child node. Thus, the child node can obtain the time slot format cycle of the link between the child node and the parent node and the time slot format of each of the time slots within the time slot format cycle.

As described above, according to the embodiment of the present disclosure, the parent node in the IAB system can configure, for the link between the parent node and the child node, the time slot format cycle and the time slot format of each of the time slots within the time slot format cycle. The process is usually performed during the initial access of the child node. Then, each of the nodes in the IAB system may perform uplink/downlink information transmission according to the configured time slot format cycle and the configured time slot format. The update of the time slot format of all or part of the links in the IAB system is described below.

According to an embodiment of the present disclosure, the DN can update a time slot format for each of links in the IAB system. That is, the DN can configure an updated time slot format of each of the time slots within one time slot format cycle for each of the links in the IAB system, and transmit updated time slot configuration information to corresponding nodes, where the corresponding nodes includes two nodes at both ends of a link. The updated time slot configuration information indicates information of the updated time slot format of each of the time slots within one time slot format cycle.

According to an embodiment of the present disclosure, in a case that the electronic apparatus 200 is a DN, the format configuration unit 220 may update the time slot format according to one or more of the following information: location information of each of nodes in the IAB system, beam direction of each of the nodes in the IAB system, Buffer Status Report (BSR) messages, traffic volume, and priority of a data packet of each of the nodes in the IAB system.

According to an embodiment of the present disclosure, the electronic apparatus 200 may, before transmitting the updated time slot configuration information to other nodes in the IAB system, transmit update request information to the other nodes. In an embodiment, the update request information includes update starting time of the updated time slot format. The update starting time may indicate starting time for updating the time slot formats of all the links in the IAB system. Further, the update starting time should be at a beginning of a time slot format cycle. Assuming that the time slot format cycle is equal to a length of a subframe, that is, 1 ms, the update starting time may indicate from which subframe the updated time slot format is adopted. For example, the electronic apparatus 200 may transmit the update request information to other nodes through high layer signaling including but not limited to RRC signaling.

Table 9 shows an example of a field required to be added in the RRC signaling and a value of the field, where slotformat_changetime indicates update starting time of an updated time slot format.

TABLE 9

| Field | Value |
| --- | --- |
| slotformat_changetime | BIT STRING |

For example, the electronic apparatus 200 may add the following codes in the RRC signaling such as UL-DL-Configuration-common, UL-DL-Configuration-common-set2, and UL-DL-Configuration-dedicate:

```
TDD-UL-DL-ConfigCommon::=           SEQUENCE{
    referenceSubcarrierSpacing          SubcarrierSpacing
                                            OPTIONAL,
    dl-UL-TransmissionPeriodicity       ENUMERATED    {ms0p5,
ms0p625, ms1, ms1p25, ms2, ms2p5, ms5, ms10}          OPTIONAL,
    nrofDownlinkSlots                   INTEGER(0..maxNrofSlots)
                                                      OPTIONAL,
    nrofDownlinkSymbols                 INTEGER
(0..maxNrofSymbols-1)
        OPTIONAL,      -- Need R
    nrofUplinkSlots                     INTEGER (0..maxNrofSlots)
                                                      OPTIONAL,
    nrofUplinkSymbols
    INTEGER(0..maxNrofSymbols-1)        slotformatchangetime
    BIT STRING    (SIZE (3-4)) }
```

According to an embodiment of the present disclosure, the electronic apparatus 200 may transmit update request information to all the other nodes in the IAB system, and receive update response information from the other nodes. That is, if other nodes receive the update request information, the other nodes may transmit the update response information to the electronic apparatus 200, so that the electronic apparatus 200 may determine whether all the other nodes have received the update request information.

According to an embodiment of the present disclosure, the update response information may indicate whether a node itself, or the node itself and a child node of the node (if possible, further including a child node of the child node)

have received the update request information. In a case that the node has no child nodes, the node may transmit ACK information to a parent node of the node after the node receives the update request information; and in a case that the node has child nodes, the node may transmit the ACK information to the parent node of the node after the node receives ACK information from all the child nodes, or the node may transmit NACK information to the parent node of the node if any one of the child nodes does not feed the update response information (or feeds NACK information). Therefore, the update response information from a node may indicate whether all nodes below the node have received the update request information.

According to an embodiment of the present disclosure, if the update response information indicates that one or more other nodes have not received the update request information, the update request information is retransmitted to the one or more other nodes. The electronic apparatus 200 transmits the updated time slot configuration information to all the other nodes in the IAB system if the update response information indicates that all the other nodes have received the update request information.

As described above, according to the embodiment of the present disclosure, the electronic apparatus 200 transmits the updated time slot configuration information to all nodes if all the nodes have received the update request information including the update starting time. Thus, it can be ensured that all the nodes in the IAB system can obtain the update starting time, so that the time slot formats are updated at the update starting time.

According to an embodiment of the present disclosure, the electronic apparatus 200 may transmit the updated time slot configuration information to all other nodes, for example, through low layer signaling (including but not limited to DCI).

According to an embodiment of the present disclosure, the format management unit 260 in the electronic apparatus 200 may, after the electronic apparatus 200 transmits the updated time slot configuration information to all the other nodes, update the time slot format of the links related to the electronic apparatus 200 at the update starting time. Accordingly, each of the other nodes updates the time slot format of the link related to the node itself at the update starting time.

Figure 10:
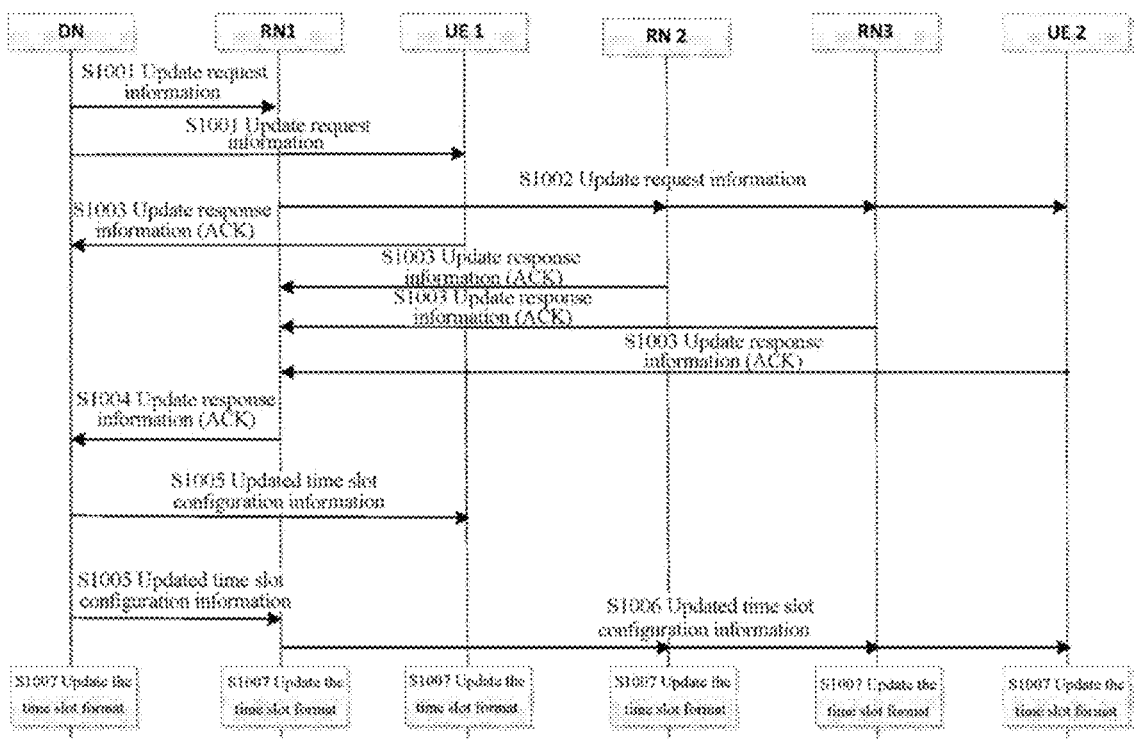
FIG. 10 is a signaling flow chart of updating, by a DN, a time slot format of each of links in an IAB system according to an embodiment of the present disclosure.
Figure 11:
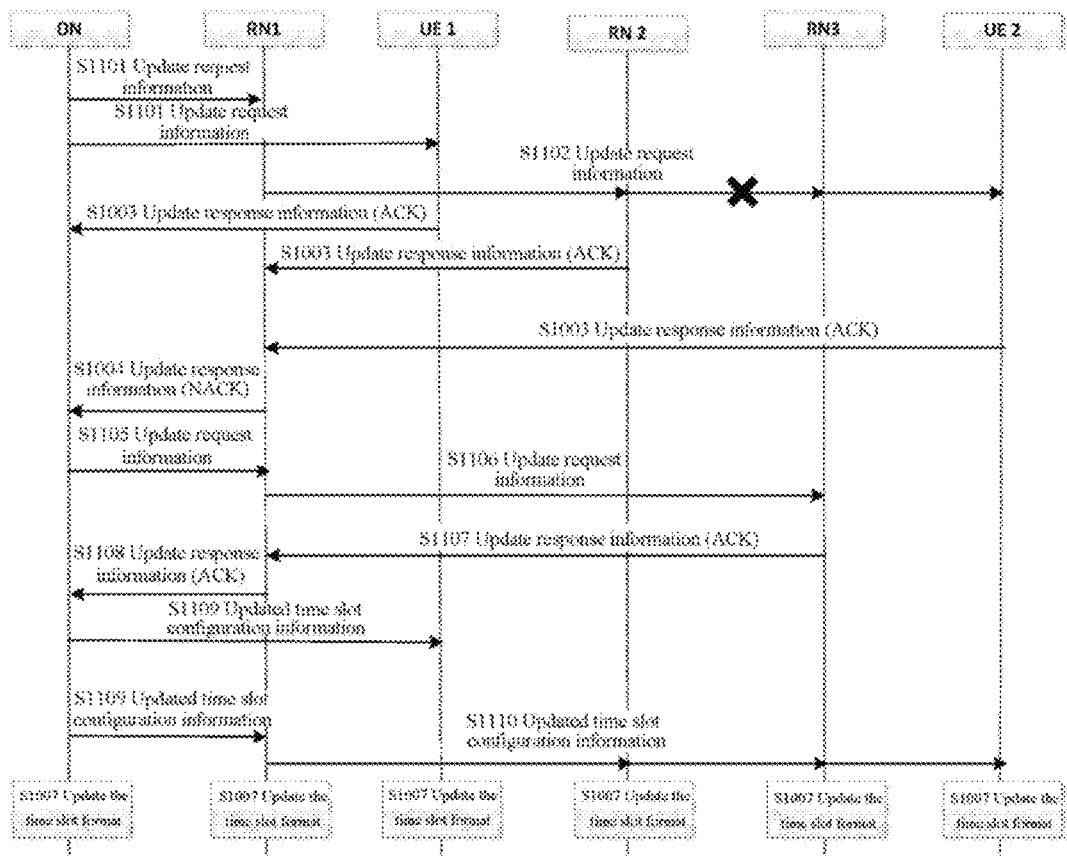
FIG. 11 is a signaling flow chart of updating, by a DN, a time slot format of each of links in an IAB system according to an embodiment of the present disclosure.

FIG. 10 and FIG. 11 are signaling flow charts of updating, by a DN, a time slot format of each of nodes in an IAB system according to an embodiment of the present disclosure. In FIG. 10 and FIG. 11, the IAB system adopts the structure shown in FIG. 1.

As shown in FIG. 10, in step S1001, DN determines to update the time slot formats of all links in the IAB system and transmits update request information to RN1 and UE1. In step S1002, RN1 transmits update request information to the child nodes RN2, RN3 and UE2. In step S1003, it is assumed that UE1 has received the update request information from DN, then UE1 transmits update response information including ACK information to DN; and it is assumed that RN2, RN3, and UE2 have received the update request information from RN1, then RN2, RN3, and UE2 transmit update response information including ACK information to RN1. In step S1004, since RN1 has received the update response information including ACK information from all the child nodes, RN1 transmits update response information including ACK information to DN. In step S1005, since DN has received ACK information from all the child nodes, DN transmits updated time slot configuration information to UE1 and RN1. In step S1006, RN1 transmits time slot configuration information to RN2, RN3, and UE2. The time slot configuration information transmitted to RN1 includes the time slot formats of the BH1 link, the BH2 link, the BH3 link and the AC2 link. The time slot configuration information transmitted to UE1 includes the time slot format for the AC1 link. The time slot configuration information transmitted to RN2 includes the time slot format for the BH2 link. The time slot configuration information transmitted to RN3 includes the time slot format for the BH3 link. The time slot configuration information transmitted to UE2 includes the time slot format for the AC2 link. In step S1007, all the nodes in the IAB system update the time slot formats for related links at the update starting time. For example, DN updates the time slot formats for the links BH1 and AC1, RN1 updates the time slot formats for the BH1 link, the BH2 link, the BH3 link and the AC2 link, UE1 updates the time slot format for the AC1 link, and RN2 updates the time slot format for the BH2 link, RN3 updates the time slot format for the BH3 link, UE2 updates the time slot format for the AC2 link. Thus, the time slot formats in the IAB system are updated.

As shown in FIG. 11, in step S1101, DN determines to update the time slot formats of all links in the IAB system and transmits update request information to RN1 and UE1. In step S1102, RN1 transmits update request information to the child nodes RN2, RN3 and UE2. In step S1103, it is assumed that UE1 has received the update request information from DN, then UE1 transmits update response information including ACK information to DN; and it is assumed that RN2 and UE2 have received the update request information from RN1, then RN2 and UE2 transmit update response information including ACK information to RN1; and since RN3 has not received the update request information from RN1, RN3 does not transmit update response information to RN1. In step S1104, since RN1 has not received the update response information including ACK information from all the child nodes, RN1 transmits update response information including NACK information to DN. In step S1105, DN retransmits the updated time slot configuration information to RN1. In step S1106, RN1 retransmits the updated time slot configuration information to RN3. In step S1107, it is assumed that RN3 has received the update request information from RN1, then RN3 transmits update response information to RN1. In step S1108, RN1 transmits update response information including ACK information to DN. In step S1109, DN transmits updated time slot configuration information to UE1 and RN1. In step S1110, RN1 transmits time slot configuration information to RN2, RN3, and UE2. In step S1111, all the nodes in the IAB system update the time slot formats for related links at the update starting time. Thus, the time slot formats in the IAB system are updated.

As described above, according to the embodiments of the present disclosure, the DN can update the time slot formats for all the links in the IAB system, and the updated time slot formats still meet the requirements of the half-duplex mode of the IAB system.

According to an embodiment of the present disclosure, the RN may update a time slot format for each of part of links in the IAB system. Furthermore, the update is time-sensitive, that is, the update of the time slot format for the link by the RN is temporary.

According to an embodiment of the present disclosure, in a case that the electronic apparatus 200 is a RN, the electronic apparatus 200 may update the time slot format for the link between the electronic apparatus 200 and a child node of the electronic apparatus 200, and update a time slot format for the link between the electronic apparatus 200 and a parent node of the electronic apparatus 200. That is, the format configuration unit 220 may configure an updated time slot format of each of time slots within one time slot format cycle for a link between the electronic apparatus 200 and a child node of the electronic apparatus 100, and the communication unit 230 may transmit updated time slot configuration information to the child node of the electronic apparatus 200. Furthermore, the format configuration unit 220 may configure an updated time slot format of each of time slots within one time slot format cycle for a link between the electronic apparatus 200 and a parent node of the electronic apparatus 200, and the communication unit 230 may transmit updated time slot configuration information to the parent node of the electronic apparatus 200.

According to an embodiment of the present disclosure, the updated time slot configuration information may indicate information of the updated time slot format of each of the time slots within one time slot format cycle. In an embodiment, the electronic apparatus 200 may transmit the updated time slot configuration information to the child node of the electronic apparatus 200 through low layer signaling including but not limited to DCI, and transmit the updated time slot configuration information to the parent node of the electronic apparatus 200 through low layer signaling including but not limited to Uplink Control Information (UCI).

According to an embodiment of the present disclosure, in a case that the electronic apparatus 200 has multiple child nodes, the electronic apparatus 200 may update a time slot format of a link between the electronic apparatus 200 and each of the multiple child nodes.

According to an embodiment of the present disclosure, the electronic apparatus 200 may transmit update starting time and update duration of the updated time slot format to the child node and the parent node of the electronic apparatus 200. The update starting time may indicate the starting time for updating the time slot format, and the update starting time should be at the beginning of a time slot format cycle. Assuming that the time slot format cycle is equal to a length of a subframe, that is, 1 ms, the update starting time may indicate from which subframe the updated time slot format is adopted. The update duration may indicate the duration of the updated time slot format, and the update duration should be an integer multiple of the time slot format cycle. Assuming that the time slot format cycle is equal to a length of a subframe, that is, 1 ms, the update duration may indicate how many subframes the updated time slot format is to be used. The update starting time and the update duration may be included in the time slot configuration information, or be independent from the time slot configuration information. For example, the electronic apparatus 200 may add fields in low layer signaling to indicate the update starting time and the update duration, where the fields and values of the fields are shown in Table 10. Slotformat-change-time indicates the update starting time, and Slotformat-change-duration indicates the update duration.

TABLE 10

| Field | Value |
| --- | --- |
| Slotformat-change-time | BIT STRING |
| Slotformat-change-duration | BIT STRING |

According to an embodiment of the present disclosure, the number of symbols for transmitting information by the electronic apparatus 200 is increased in the updated time slot format of the link between the electronic apparatus 200 and the child node of the electronic apparatus 200 and in the updated time slot format of the link between the electronic apparatus 200 and the parent node of the electronic apparatus 200. That is, if the electronic apparatus 200 wants to increase the number of symbols for transmitting information, the electronic apparatus 200 may update the time slot format of the link between the electronic apparatus 200 and the child node of the electronic apparatus 200 and update the time slot format of the link between the electronic apparatus 200 and the parent node of the electronic apparatus 200. The symbols for transmitting information may be UL symbols or DL symbols. For example, the electronic apparatus 200 increases the number of DL symbols of the link between the electronic apparatus 200 and the child node of the electronic apparatus 200, and increases the number of UL symbols of the link between the electronic apparatus 200 and the parent node of the electronic apparatus 200.

Figure 12:
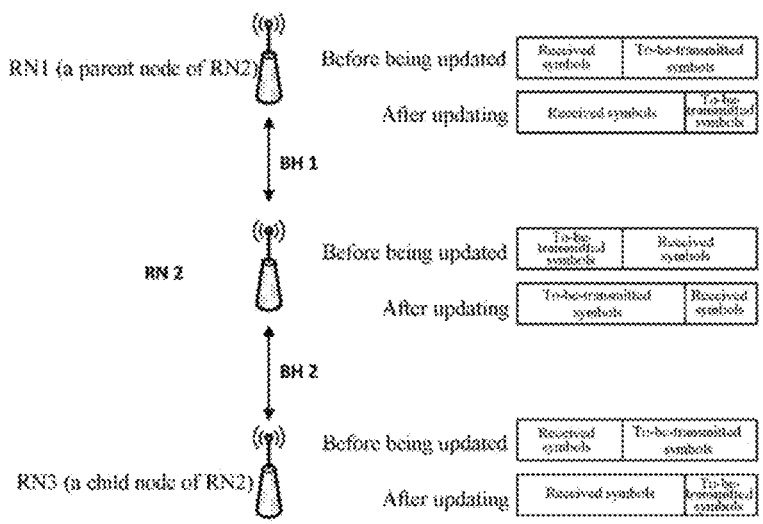
FIG. 12 is a signaling flow chart of updating, by a RN, a time slot format of each of part of links in an IAB system according to an embodiment of the present disclosure.

FIG. 12 is a signaling flow chart of updating, by a RN, a time slot format of each of part of links in an IAB system according to an embodiment of the present disclosure. As shown in FIG. 12, assuming that RN1 is a parent node of RN2, RN3 is a child node of RN2, the link between RN2 and RN1 is BH1, and the link between RN2 and RN3 is BH2. If RN2 wants to increase the number of symbols for transmitting information, it indicates that the number of UL symbols is increased for the BH1 link and the number of DL symbols is increased for the BH2 link. In this case, RN2 may configure updated time slot format for the BH1 link and for the BH2 link, and generate time format configuration information. Furthermore, RN2 may transmit updated time slot configuration information for BH1 link to RN1, and transmit updated time slot configuration information for BH2 link to RN3.

According to an embodiment of the present disclosure, the electronic apparatus 200 may receive response information indicating whether to agree to update the time slot format from the child node and parent node of the electronic apparatus 200 after transmitting the updated time slot configuration information to the child node and the parent node. The format management unit 260 may, if the response information from the child node of the electronic apparatus 200 indicates that the child node agrees to update the time slot format and the response information from the parent node of the electronic apparatus 200 indicates that the parent node agrees to update the time slot format, update the time slot format at the update starting time, and restore, after the update duration, the time slot format to the time slot format before being updated. In this case, the child node and the parent node may update the time slot format at the update starting time, and restore, after the update duration, the time slot format to the time slot format before being updated.

According to an embodiment of the present disclosure, if the response information from the child node of the electronic apparatus 200 indicates that the child node disagrees to update the time slot format and/or the response information from the parent node of the electronic apparatus 200 indicates that the parent node disagrees to update the time slot format, the time slot format is not updated. In this case, the electronic apparatus 200 may transmit information indicating that the time slot format is not to be updated to the child node and the parent node. In an embodiment, the electronic apparatus 200 may transmit the information to the child node and the parent node through low layer signaling (including but not limited to DCI and UCI).

According to an embodiment of the present disclosure, the DN may add a field in the RRC signaling, where the field and a value of the field are shown in the following Table. Slotformat-changebyRN-applicable indicates whether to allow the RN to update the time slot formats of part of links in the IAB system.

TABLE 11

| Field | Value |
|---|---|
| Slotformat-changebyRN-applicable | BOOLEAN |

That is, only after the electronic apparatus 200 is configured to be allowed to update the time slot formats of part of the links in the IAB system, the electronic apparatus 200 may update the time slot format of the link between the electronic apparatus 200 and the child node and the time slot format of the link between the electronic apparatus 200 and the parent node. For example, the following codes may be added in the RRC signaling such as UL-DL-Configuration-common, UL-DL-Configuration-common-set2, and UL-DL-Configuration-dedicate:

```
TDD-UL-DL-ConfigCommon::=    SEQUENCE{
    referenceSubcarrierSpacing          SubcarrierSpacing
                                            OPTIONAL,
    dl-UL-TransmissionPeriodicity       ENUMERATED    {ms0p5,
ms0p625, ms1, ms1p25, ms2, ms2p5, ms5, ms10}    OPTIONAL,
    nrofDownlinkSlots                   INTEGER (0..maxNrofSlots)
                                            OPTIONAL,
    nrofDownlinkSymbols                 INTEGER
(0..maxNrofSymbols-1)
    OPTIONAL,         -- Need R
    nrofUplinkSlots                     INTEGER (0..maxNrofSlots)
                                            OPTIONAL,
    nrofUplinkSymbols                   INTEGER
(0..maxNrofSymbols-1)   SlotformatchangebyRNapplicable    BOOLEAN
                                            }
```

Figure 13:
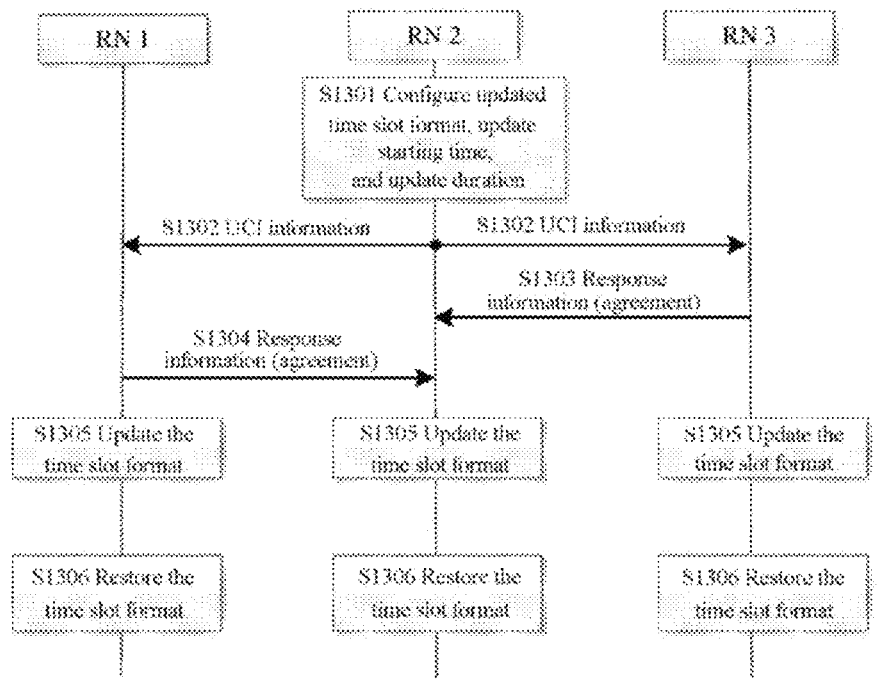
FIG. 13 is a signaling flow chart of updating, by a RN, a time slot format of each of part of links in an IAB system according to an embodiment of the present disclosure.
Figure 14:
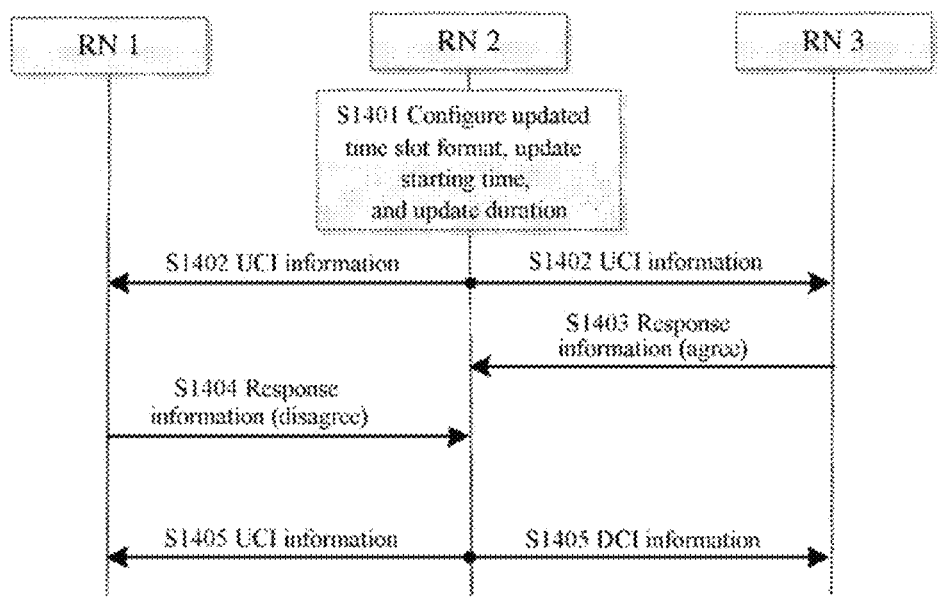
FIG. 14 is a signaling flow chart of updating, by a RN, a time slot format of each of part of links in an IAB system according to an embodiment of the present disclosure.

FIG. 13 and FIG. 14 are signaling flow charts of updating, by a RN, a time slot format of each of part of nodes in an IAB system according to an embodiment of the present disclosure. In FIG. 13 and FIG. 14, the structure shown in FIG. 12 is adopted, that is, RN1 is a parent node of RN2, and RN3 is a child node of RN2.

As shown in FIG. 13, in step S1301, RN2 configures updated time slot format, update starting time, and update duration for the BH1 link and the BH2 link. In step S1302, RN2 transmits the updated time slot format, the update starting time and the update duration for the BH1 link to RN1 through UCI, and transmit the updated time slot format, the update starting time and the update duration for the BH2 link to RN3 through DCI. In step S1303, RN3 transmits response information indicating that RN3 agrees to update the time slot format to RN2. In step S1304, RN1 transmits response information indicating that RN1 agrees to update the time slot format to RN2. In step S1305, RN1, RN2, and RN3 respectively update the time slot format of the related link at the update starting time. For example, RN1 updates the time slot format of the BH1 link, RN2 updates the time slot format of the BH1 link and the BH2 link, and RN3 updates the time slot format of the BH2 link. In step S1306, RN1, RN2, and RN3 respectively restore the time slot format to the time slot format before being updated after the update duration. Thus, RN2 may temporarily change the time slot format of the link between RN2 and the child node of RN2 and the time slot format of the link between RN2 and the parent node of RN2.

As shown in FIG. 14, in step S1401, RN2 configures updated time slot format, update starting time, and update duration for the BH1 link and the BH2 link. In step S1402, RN2 transmits the updated time slot format, the update starting time and the update duration for the BH1 link to RN1 through UCI, and transmit the updated time slot format, the update starting time and the update duration for the BH2 link to RN3 through DCI. In step S1403, RN3 transmits response information indicating that RN3 agrees to update the time slot format to RN2. In step S1404, RN1 transmits response information indicating that RN1 disagrees to update the time slot format to RN2. In step S1405, RN2 transmits information indicating that the time slot format is not to be updated to RN1 through UCI, and transmits information indicating that the time slot format is not to be updated to RN3 through DCI. In the embodiment shown in FIG. 14, RN1 disagrees to update the time slot format. According to the embodiment of the present disclosure, if RN3 disagrees to update the time slot format, or both RN1 and RN3 do not agree to update the time slot format, RN2 should transmit information indicating that the time slot format is not to be updated to RN1 and RN3.

According to the embodiments of the present disclosure, a time slot format cycle and a time slot format can be configured for a link according to a subcarrier interval of the link. To save signaling overhead, some time slot formats are defined and the way of reporting a time slot format is optimized according to the present disclosure. In addition, the DN can update the time slot formats for all links in the IAB system, and the RN can update the time slot formats for a part of links in the IAB system. In summary, the process for configuring the time slot format in the IAB system is optimized according to the embodiments of the present disclosure.

Figure 15:
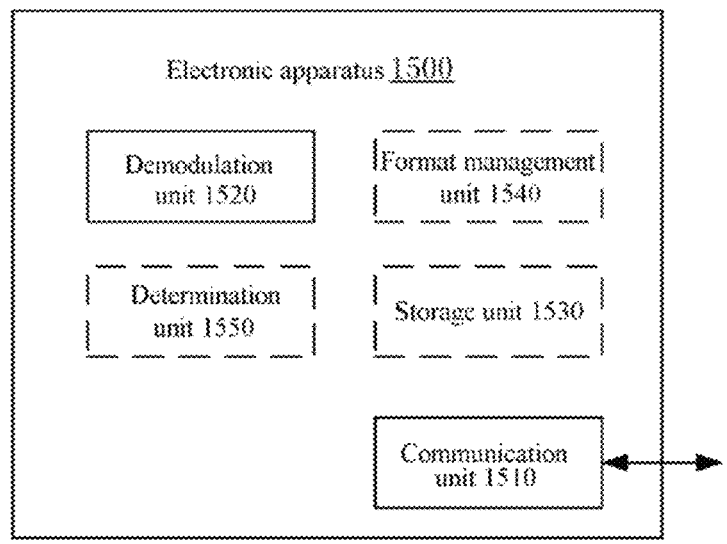
FIG. 15 is a block diagram showing an example of a configuration of an electronic apparatus according to another embodiment of the present disclosure.

FIG. 15 is a block diagram showing a structure of an electronic apparatus 1500 serving as a child node in an IAB wireless communication system according to an embodiment of the present disclosure. The electronic apparatus 1500 may serve as a RN or a UE in the IAB wireless communication system. It should be noted that, since both the electronic apparatus 1500 and the electronic apparatus 200 may serve as the RN in the IAB wireless communication system, the RN may be compatible with the structures and functions of the electronic apparatus 200 and the electronic apparatus 1500.

As shown in FIG. 15, the electronic apparatus 1500 may include a communication unit 1510 and a demodulation unit 1520.

All units of the electronic apparatus 1500 may be included in processing circuitry. It should be noted that the electronic apparatus 1500 may include one or more processing circuitry. The processing circuitry may include various independent functional units to perform various different functions and/or operations. It should be noted that the functional units may be physical entities or logical entities, and units with different names may be implemented by the same physical entity.

According to an embodiment of the present disclosure, the communication unit 1510 may receive a time slot format cycle of a link between the electronic apparatus 1500 and a parent node of the electronic apparatus 1500 from the parent node. The time slot format cycle included a predetermined number of time slots.

According to an embodiment of the present disclosure, the communication unit 1510 may receive time slot configuration information from the parent node.

According to an embodiment of the present disclosure, the demodulation unit may demodulate the time slot configuration information to obtain the time slot format of each of time slots of the link between the electronic apparatus 1500 and the parent node within one time slot format cycle.

As described above, according to the embodiments of the present disclosure, the electronic apparatus 1500 may receive the time slot format cycle and the time slot format of each of the time slots within one time slot format cycle from the parent node, thereby optimizing the configuration of the time slot format in the IAB system.

According to an embodiment of the present disclosure, the communication unit 1510 may receive the time slot format cycle of the link between the electronic apparatus 1500 and the parent node through high layer signaling.

According to the embodiment of the present disclosure, the demodulation unit 1520 may demodulate the time slot configuration information to obtain identification information of the time slot format of each of the time slots within one time slot format cycle. The demodulation unit 1520 may determine the time slot format of each of the time slots according to the identification information of the time slot format of the time slot.

As shown in FIG. 15, the electronic apparatus 1500 may further include a format management unit 1540 according to an embodiment of the present disclosure. The format management unit 1540 is configured to manage the time slot format of each of the links related to the electronic apparatus 1500. For example, the electronic apparatus 1500 may store the demodulated time slot format in the format management unit 1540.

According to an embodiment of the present disclosure, the demodulation unit 1520 may demodulate the time slot configuration information to obtain identification information of each of one or more time slots in which uplink/downlink conversion occurs within one time slot format cycle, and identification information of a time slot format of the time slot. The demodulation unit 1520 may determine, according to the identification information of each of the one or more time slots in which uplink/downlink conversion occurs and the identification information of the time slot format of the time slot, a uplink/downlink type of each of symbols within one time slot format cycle. For example, it is assumed that one time slot format cycle includes four time slots. If the demodulation unit 1520 determines that there is only one time slot, a second time slot, in which uplink/downlink conversion occurs, and the time slot format of the time slot is DL, DL, DL, DL, DL, DL, UL, UL, UL, UL, UL, UL, UL, and UL, the demodulation unit 1520 may determine that a first time slot has a time slot format of all DL symbols, a third time slot has a time slot format of all UL symbols, and a fourth time slot has a time slot format of all UL symbols.

According to an embodiment of the present disclosure, the communication unit 1510 may receive the identification information of each of the one or more time slots in which uplink/downlink conversion occurs through high layer signaling. Further, the communication unit 1510 may receive the identification information of the time slot format of each of the one or more time slots in which uplink/downlink conversion occurs through low layer signaling.

As described above, some new time slot formats are defined according to the present disclosure, as shown in Table 3 and Table 7. As shown in FIG. 15, the electronic apparatus 1500 may further include a storage unit 1530 according to an embodiment of the present disclosure. The storage unit 1530 is configured to store a mapping relationship between the numbers of the newly defined time slot formats and the time slot formats. Thus, the demodulation unit 1520 may determine a time slot format according to the table stored in the storage unit 1530 after demodulating the number of the time slot format.

According to an embodiment of the present disclosure, the communication unit 1510 may receive updated time slot configuration information from a DN. The demodulation unit 1520 may determine, according to the updated time slot configuration information, an updated time slot format of each of the time slots within one time slot format cycle of the link between the electronic apparatus 1500 and the parent node of the electronic apparatus 1500 and an updated time slot format of each of time slots within one time slot format cycle of a link between the electronic apparatus 1500 and a child node of the electronic apparatus 1500 (if the electronic apparatus 1500 has a child node). That is, the demodulation unit 1520 may determine a time slot format of a link related to the electronic apparatus 1500 according to the updated time slot configuration information. The link related to the electronic apparatus 1500 includes a link with the electronic apparatus 1500 as an end, a link between the electronic apparatus 1500 and each of the child nodes, and a link between the electronic apparatus 1500 and the parent node.

In an embodiment, the communication unit 1510 may receive the updated time slot configuration information through low layer signaling.

According to an embodiment of the present disclosure, the communication unit 1510 may, before receiving the updated time slot configuration information from DN, receive update request information from DN, and the communication unit 1510 may, if the update request information has been received from DN, transmit update response information to DN.

According to an embodiment of the present disclosure, in a case that the electronic apparatus 1500 has no child nodes, the electronic apparatus 1500 may, after receiving the update request information, transmit update response information including ACK to the parent node of the electronic apparatus 1500; in a case that the electronic apparatus 1500 has child nodes, the electronic apparatus 1500 may, after receiving update response information including ACK from each of the child nodes of the electronic apparatus 1500, transmit the update response information including ACK to the parent node of the electronic apparatus 1500; and in a case that the electronic apparatus 1500 has child nodes, the electronic apparatus 1500 may, after receiving update response information including NACK from one or more of the child nodes or receiving no update response information from the one or more of the child nodes, transmit the update response information including NACK to the parent node of the electronic apparatus 1500.

According to an embodiment of the present disclosure, the update request information includes update starting time of the updated time slot format. The communication unit 1510 may receive the update request information through the high layer signaling.

According to an embodiment of the present disclosure, the format management unit 1540 may update the time slot format of each of the time slots within one time slot format cycle at the update starting time.

As described above, the electronic apparatus 1500 may update the time slot formats of the links related to the electronic apparatus 1500 according to the instruction from the DN.

According to an embodiment of the present disclosure, the communication unit 1510 may receive updated time slot configuration information from the parent node of the electronic apparatus 1500, and the demodulation unit 1520 may determine an updated time slot format of each of the time slots within one time slot format cycle of the link between the electronic apparatus 1500 and the parent node according to the updated time slot configuration information.

In an embodiment, the demodulation unit 1510 may demodulate the time slot configuration information to obtain update starting time and update duration of the updated time slot format. The communication unit 1510 may receive the updated time slot configuration information from the parent node of the electronic apparatus 1500 through low layer signaling.

As shown in FIG. 15, the electronic apparatus 1500 may further include a determination unit 1550 according to an embodiment of the present disclosure. The determination unit 1550 is configured to determine whether to agree to update the time slot format after the updated slot configuration information is received from the parent node. The communication unit 1510 may transmit response information indicating whether to agree to update the time slot format to the parent node of the electronic apparatus 1500.

According to an embodiment of the present disclosure, if the electronic apparatus 1500 has not received information indicating that the time slot format is not to be updated from the parent node before the update starting time, the format management unit 1540 may update the time slot format of each of the time slots of the link between the electronic apparatus 1500 and the parent node within one time slot format cycle at the update starting time, and after the update duration, the format management unit 1540 may restore the time slot format to the time slot format before being updated.

According to an embodiment of the present disclosure, if the electronic apparatus 1500 receives information indicating that the time slot format is not to be updated from the parent node before the update starting time, the electronic apparatus 1500 does not update the time slot format.

According to an embodiment of the present disclosure, the number of symbols for receiving information by the electronic apparatus 1500 is increased in the updated time slot format of the link between the electronic apparatus 1500 and the parent node according to the time slot format demodulated by the demodulation unit 1520.

As described above, according to the embodiments of the present disclosure, the electronic apparatus 1500 may receive updated time slot configuration information from the parent node to temporarily update the time slot format of the link between the electronic apparatus 1500 and the parent node. The electronic apparatus 1500 may receive updated time slot configuration information from the child node to temporarily update the time slot format of the link between the electronic apparatus 1500 and the child node.

That is, the communication unit 1510 may receive the updated time slot configuration information from the child node of the electronic apparatus 1500, and the demodulation unit 1520 may determine the updated time slot format of each of the time slots of the link between the electronic apparatus 1500 and the child node within one time slot format cycle according to the updated time slot configuration information. In an embodiment, the demodulation unit 1510 may demodulate the time slot configuration information to obtain the update starting time and the update duration of the updated time slot format. In an embodiment, the communication unit 1510 may receive updated time slot configuration information from the child node of the electronic apparatus 1500 through low layer signaling. In an embodiment, the determining unit 1550 may be configured to determine whether to agree to update the time slot format after the updated time slot configuration information is received from the child node. The communication unit 1510 may transmit response information indicating whether to agree to update the slot format to the child node of the electronic apparatus 1500. According to an embodiment of the present disclosure, if the electronic apparatus 1500 has not received information indicating that the time slot format is not to be updated from the child node before the update starting time, the format management unit 1540 may update the time slot format of each of the time slots of the link between the electronic apparatus 1500 and the child node within one time slot format cycle at the update starting time, and after the update duration, the format management unit 1540 may restore the time slot format to the time slot format before being updated. If the electronic apparatus 1500 has received information indicating that the time slot format is not to be updated from the child node before the update starting time, the electronic apparatus 1500 does not update the time slot format. In addition, the number of symbols received by the electronic apparatus 1500 for transmitting information is increased in the updated time slot format of the link between the electronic apparatus 1500 and the child node according to the time slot format demodulated by the demodulation unit 1520.

As described above, according to the embodiments of the present disclosure, the electronic apparatus 1500 may receive a time slot format cycle and a time slot format of each of time slots within one time slot format cycle from the parent node. The electronic apparatus 1500 may update the time slot format of each of the links in the IAB system according to the instruction from the DN, may update the time slot format of the link between the electronic apparatus 1500 and the parent node of the electronic apparatus 1500 according to the instruction from the parent node, and may update the time slot format of the link between the electronic apparatus 1500 and the child node of the electronic apparatus 1500 according to the instruction from the child node. In summary, with the electronic apparatus 1500 according to the embodiments of the present disclosure, the configuration of the time slot format in the IAB system can be optimized.

The electronic apparatus 200 according to the embodiments of the present disclosure may serve as the parent node in the IAB system, and the electronic apparatus 1500 may serve as the child node in the IAB system, so that all the embodiments of the electronic apparatus 200 are applicable herein.

A wireless communication method performed by an electronic apparatus 200 serving as a parent node in an IAB wireless communication system according to an embodiment of the present disclosure is described in detail below.

Figure 16:
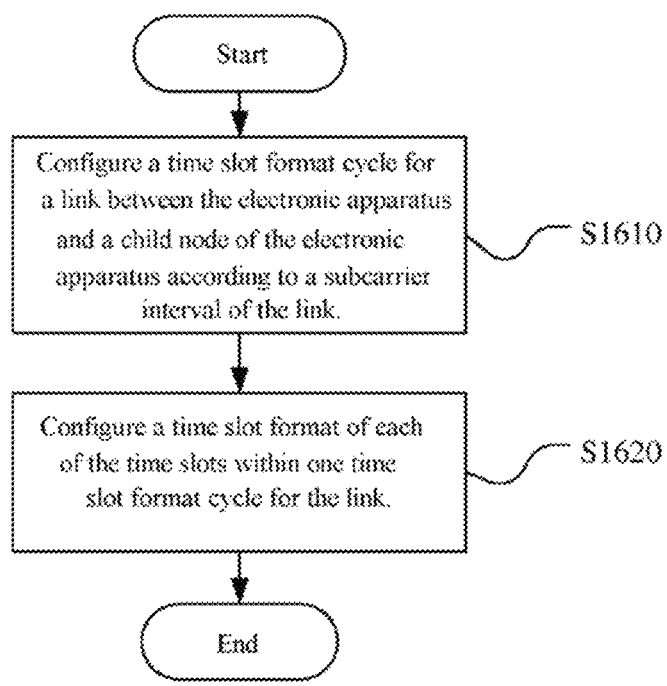
FIG. 16 is a flow chart of a wireless communication method performed by an electronic apparatus according to an embodiment of the present disclosure.

FIG. 16 is a flow chart of a wireless communication method performed by an electronic apparatus 200 serving as a parent node in an IAB wireless communication system according to an embodiment of the present disclosure.

As shown in FIG. 16, in step S1610, a time slot format cycle is configured for a link between the electronic apparatus and a child node of the electronic apparatus according to a subcarrier interval of the link. The time slot format cycle includes a predetermined number of time slots.

In step S1620, a time slot format of each of the time slots within one time slot format cycle is configured for the link.

In an embodiment, the configuring a time slot format cycle for the link includes: causing the subcarrier interval of the link to be proportional to a number of the time slots included in the time slot format cycle.

In an embodiment, the configuring a time slot format cycle for the child node includes: configuring a length of the time slot format cycle of the link in time domain to be equal to a length of one subframe.

In an embodiment, the wireless communication method further includes: periodically transmitting the time slot format cycle of the link to the child node.

In an embodiment, the transmitting the time slot format cycle of the link to the child node includes: periodically transmitting the time slot format cycle of the link to the child node through high layer signaling.

In an embodiment, the configuring a time slot format includes: causing uplink/downlink configuration of each of symbols within the time slot format cycle of the link to be opposite to uplink/downlink configuration of a corresponding symbol within the time slot format cycle of the link between the electronic apparatus and a parent node of the electronic apparatus, or to be the same as uplink/downlink configuration of a corresponding symbol within the time slot format cycle of the link between the electronic apparatus and another child node of the electronic apparatus.

In an embodiment, the wireless communication method further includes: transmitting time slot configuration information indicating information of the time slot format of each of the time slots within one time slot format cycle for the link to the child node.

In an embodiment, the time slot configuration information includes identification information of the time slot format of each of the time slots within one time slot format cycle.

In an embodiment, the time slot configuration information includes identification information of each of one or more time slots in which uplink/downlink conversion occurs within one time slot format cycle, and identification information of a time slot format of the time slot.

In an embodiment, the wireless communication method further includes: transmitting the identification information of each of the one or more time slots in which uplink/downlink conversion occurs to the child node through high layer signaling.

In an embodiment, the wireless communication method further includes: transmitting the identification information of the time slot format of each of the one or more time slots in which uplink/downlink conversion occurs to the child node through low layer signaling.

In an embodiment, the electronic apparatus is a donor node (DN).

In an embodiment, the wireless communication method further includes: configuring, for each of links in the IAB system, an updated time slot format of each of time slots within one time slot format cycle; and transmitting updated time slot configuration information to all other nodes in the IAB system.

In an embodiment, the wireless communication method further includes: transmitting update request information to all the other nodes in the IAB system; and receiving update response information from the other nodes.

In an embodiment, the wireless communication method further includes: retransmitting the update request information to one or more other nodes if the update response information indicates that the one or more other nodes have not received the update request information.

In an embodiment, the wireless communication method further includes: transmitting the updated time slot configuration information to all the other nodes in the IAB system if the update response information indicates that all the other nodes have received the update request information.

In an embodiment, the update request information includes update starting time of the updated time slot format.

In an embodiment, the wireless communication method further includes: updating the time slot format of each of the time slots within one time slot format cycle at the update starting time if the update response information indicates that all the other nodes have received the update request information.

In an embodiment, the wireless communication method further includes: transmitting the update request information to all the other nodes through the high layer signaling.

In an embodiment, the wireless communication method further includes: transmitting the updated time slot configuration information to all other nodes through the low layer signaling.

In an embodiment, the electronic apparatus is a relay node (RN).

In an embodiment, the wireless communication method further includes: configuring, for the link between the electronic apparatus and the child node of the electronic apparatus and the link between the electronic apparatus and the parent node of the electronic apparatus, an updated time slot format of each of the time slots within one time slot format cycle; and transmitting updated time slot configuration information to the child node and the parent node of the electronic apparatus.

In an embodiment, the wireless communication method further includes: transmitting update starting time and update duration of the updated time slot format to the child node and the parent node of the electronic apparatus.

In an embodiment, the wireless communication method further includes: receiving response information indicating whether to agree to update the time slot format respectively from the child node and the parent node of the electronic apparatus.

In an embodiment, the wireless communication method further includes: updating the time slot format at the update starting time if both the response information from the child node of the electronic apparatus indicates that the child node agrees to update the time slot format and the response information from the parent node of the electronic apparatus indicates that the parent node agrees to update the time slot format; and restoring, after the update duration, to the time slot format before being updated.

In an embodiment, the wireless communication method further includes: not updating the time slot format if the response information from the child node of the electronic apparatus indicates that the child node disagrees to update the time slot format and/or the response information from the parent node of the electronic apparatus indicates that the parent node disagrees to update the time slot format.

In an embodiment, the number of symbols transmitted by the electronic apparatus for transmitting information is increased in the updated time slot format of the link between the electronic apparatus and the child node of the electronic apparatus and in the updated time slot format of the link between the electronic apparatus and the parent node of the electronic apparatus.

In an embodiment, the wireless communication method further includes: transmitting updated time slot configuration information to the child node and the parent node of the electronic apparatus through the low layer signaling.

According to an embodiment of the present disclosure, the method may be performed by the electronic apparatus 200 according to the embodiments of the present disclosure, so all the embodiments of the electronic apparatus 200 are applicable herein.

A wireless communication method performed by an electronic apparatus 1500 serving as a child node in an IAB wireless communication system according to an embodiment of the present disclosure is described in detail below.

Figure 17:
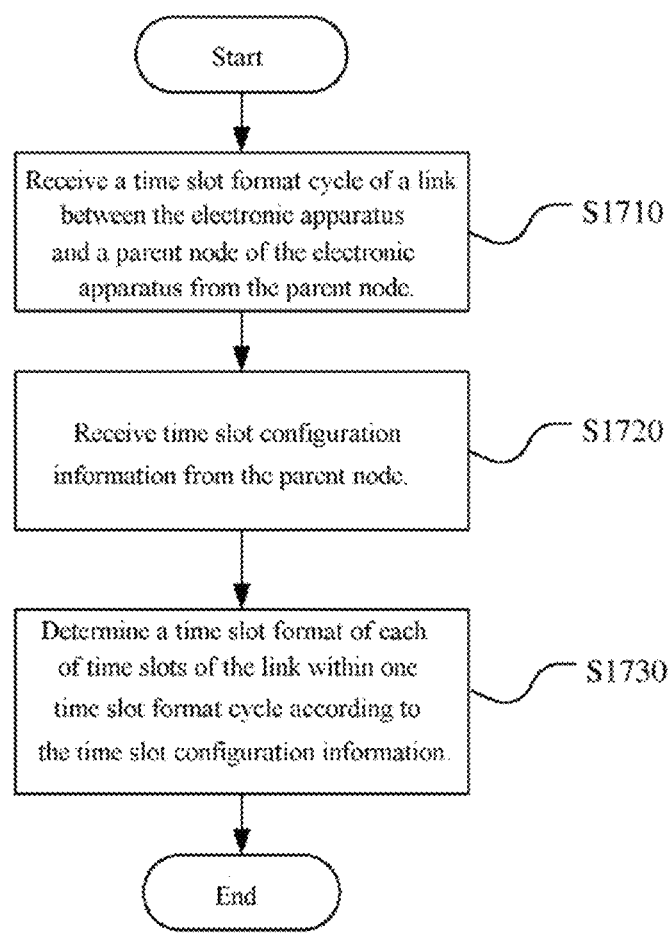
FIG. 17 is a flow chart of a wireless communication method performed by an electronic apparatus according to another embodiment of the present disclosure.

FIG. 17 is a flow chart of a wireless communication method performed by an electronic apparatus 1500 serving as a child node in an IAB wireless communication system according to an embodiment of the present disclosure.

As shown in FIG. 17, in step S1710, a time slot format cycle of a link between the electronic apparatus and a parent node of the electronic apparatus is received from the parent node. The time slot format cycle includes a predetermined number of time slots.

In step S1720, time slot configuration information is received from the parent node.

In step S1730, a time slot format of each of time slots of the link within one time slot format cycle is determined according to the time slot configuration information.

In an embodiment, the receiving a time slot format cycle includes: receiving the time slot format cycle of the link through high layer signaling.

In an embodiment, the time slot configuration information includes identification information of the time slot format of each of the time slots within one time slot format cycle.

In an embodiment, the time slot configuration information includes identification information of each of one or more time slots in which uplink/downlink conversion occurs within one time slot format cycle, and identification information of a time slot format of the time slot.

In an embodiment, the wireless communication method further includes: receiving the identification information of each of the one or more time slots in which uplink/downlink conversion occurs through high layer signaling.

In an embodiment, the wireless communication method further includes: receiving the identification information of the time slot format of each of the one or more time slots in which uplink/downlink conversion occurs through low layer signaling.

In an embodiment, the wireless communication method further includes: receiving updated time slot configuration information from a donor node DN; and determining, according to the updated time slot configuration information, an updated time slot format of each of the time slots of the link within one time slot format cycle.

In an embodiment, the wireless communication method further includes: receiving update request information from the DN; and transmitting update response information to the DN.

In an embodiment, the update request information includes update starting time of the updated time slot format.

In an embodiment, the wireless communication method further includes: updating the time slot format of each of the time slots within one time slot format cycle at the update starting time.

In an embodiment, the wireless communication method further includes: receiving the update request information through the high layer signaling.

In an embodiment, the wireless communication method further includes: receiving the updated time slot configuration information through the low layer signaling.

In an embodiment, the wireless communication method further includes: receiving updated time slot configuration information from the parent node of the electronic apparatus; and determining, according to the updated time slot configuration information, an updated time slot format of each of the time slots of the link within one time slot format cycle.

In an embodiment, the wireless communication method further includes: receiving update starting time and update duration of the updated time slot format from the parent node of the electronic apparatus.

In an embodiment, the wireless communication method further includes: transmitting response information indicating whether to agree to update the time slot format to the parent node of the electronic apparatus.

In an embodiment, the wireless communication method further includes: updating the time slot format of each of the time slots within one time slot format cycle at the update starting time; and restoring, after the update duration, to the time slot format before being updated.

In an embodiment, the wireless communication method further includes: not updating the time slot format if information indicating that the time slot format is not to be updated is received from the parent node of the electronic apparatus.

In an embodiment, the number of symbols received by the electronic apparatus for transmitting information is increased in the updated time slot format of the link.

In an embodiment, the wireless communication method further includes: receiving updated time slot configuration information from the parent node of the electronic apparatus through the low layer signaling.

In an embodiment, the electronic apparatus is a relay node (RN) or a user equipment (UE).

According to an embodiment of the present disclosure, the method may be performed by the electronic apparatus 1500 according to the embodiments of the present disclosure, so all the embodiments of the electronic apparatus 1500 are applicable herein.

The technology according to the present disclosure is applicable to various products.

The DN according to the present disclosure may be an apparatus at the network side, such as any type of Transmitting and Receiving Point (TRP) or a base station device (such as an eNB or a gNB). The RN according to the present disclosure may be an apparatus at the network side, such as a TRP or an apparatus having certain functions of a base station device, where the certain functions include but not limited to receiving data from a UE and a DN, transmitting data to a UE and a DN, and configuring certain parameters for a UE.

The base station device may be implemented as a macro eNB and a small eNB, or any type of gNB. The small eNB may be an eNB, such as a pico eNB, a micro eNB, and a home (femto) eNB, which covers a cell smaller than a macro cell. Alternatively, the base station may be implemented as any other type of base station, such as a NodeB and a base transceiver station (BTS). The base station may include a body (which is also referred to as a base station device) configured to control wireless communications; and one or more remote radio heads (RRHs) arranged in a different position from the body.

The user equipment may be implemented as a mobile terminal (such as a smart phone, a tablet personal computer (PC), a notebook PC, a portable game terminal, a portable/dongle type mobile router, and a digital camera device), or an in-vehicle terminal (such as a car navigation device). The user equipment may also be implemented as a terminal (which is also referred to as a machine type communication (MTC) terminal) that performs machine-to-machine (M2M) communication. Furthermore, the user equipment may be a wireless communication module (such as an integrated circuit module including a single die) mounted on each of the terminals.

Figure 18:
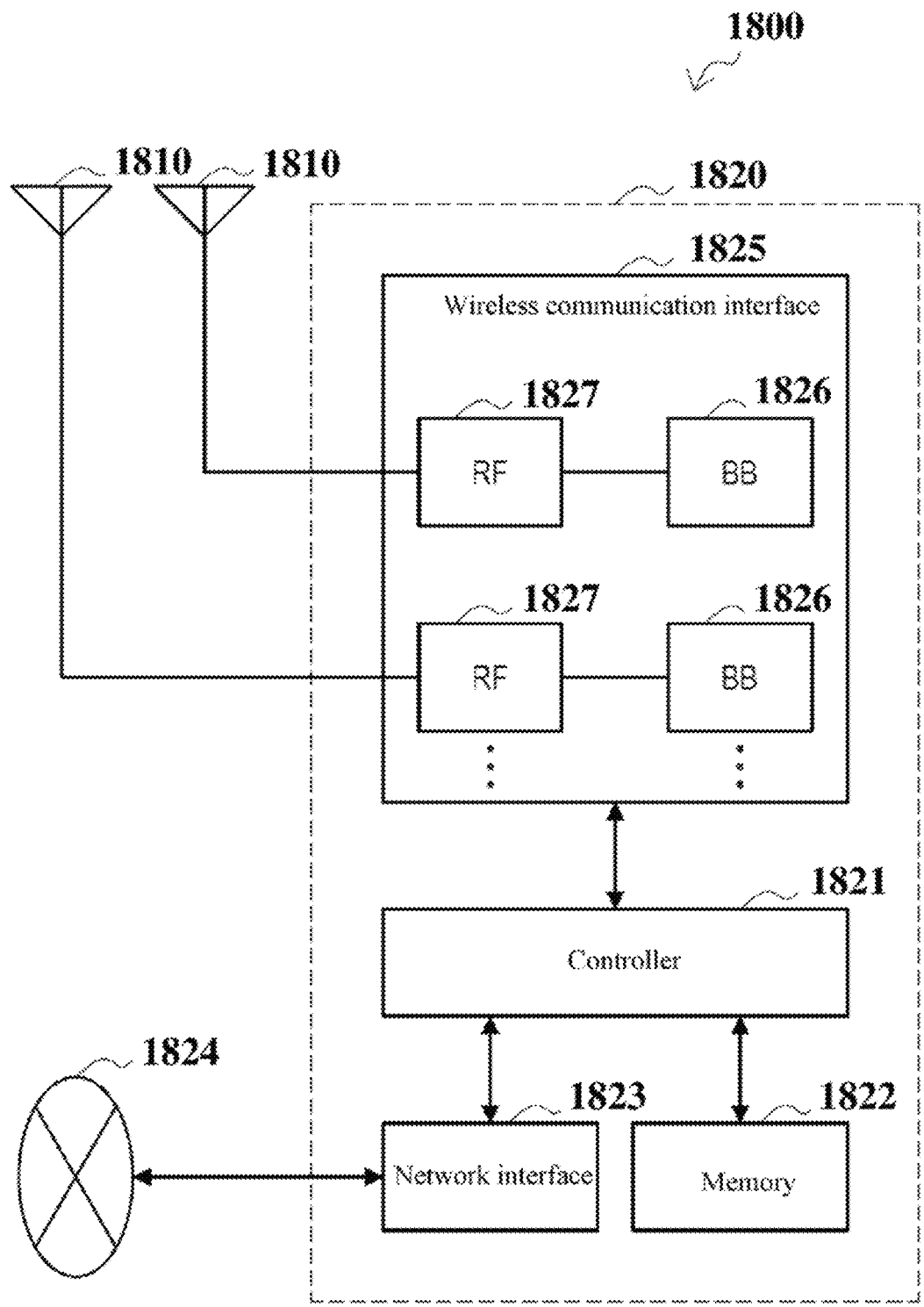
FIG. 18 is a block diagram showing a first example of a schematic configuration of a gNB (Node B in 5G communication system)

FIG. 18 is a block diagram showing a first example of a schematic configuration of a gNB to which the technology of the present disclosure may be applied. A gNB 1800 includes one or more antennas 1810 and a base station device 1820. The base station device 1820 and each of the antennas 1810 may be connected to each other via a RF cable.

Each of the antennas 1810 includes a single or multiple antenna elements (such as multiple antenna elements included in a multiple-input multiple-output (MIMO) antenna), and is used for transmitting and receiving wireless signals by the base station device 1820. As shown in FIG. 18, the gNB 1800 may include multiple antennas 1810. For example, the multiple antennas 1810 may be compatible with multiple frequency bands used by the gNB 1800. Although FIG. 18 shows the example in which the gNB 1800 includes the multiple antennas 1810, the gNB 800 may also include a single antenna 1810.

The base station device 1820 includes a controller 1821, a memory 1822, a network interface 1823, and a wireless communication interface 1825.

The controller 1821 may be, for example, a CPU or a DSP, and operate various functions of a higher layer of the base station device 1820. For example, the controller 1821 generates a data packet from data in signals processed by the wireless communication interface 1825, and transfers the generated packet via the network interface 1823. The controller 1821 may bundle data from multiple base band processors to generate a bundled packet, and transfer the generated bundled packet. The controller 1821 may have logical functions of performing control such as radio resource control, radio bearer control, mobility management, admission control, and scheduling. The control may be performed in corporation with a gNB or a core network node in the vicinity. The memory 1822 includes a RAM and a ROM, and stores a program which is executed by the controller 1821, and various types of control data (such as a terminal list, transmission power data, and scheduling data).

The network interface 1823 is a communication interface for connecting the base station device 1820 to a core network 1824. The controller 1821 may communicate with a core network node or another gNB via the network interface 1823. In this case, the gNB 1800 and the core network node or the other gNB may be connected to each other via a logical interface (such as an S1 interface and an X2 interface). The network interface 1823 may also be a wired communication interface or a wireless communication interface for radio backhaul. If the network interface 1823 is a wireless communication interface, the network interface 1823 may use a higher frequency band for wireless communication than a frequency band used by the wireless communication interface 1825.

The wireless communication interface 1825 supports any cellular communication scheme (such as Long Term Evolution (LTE) and LTE-Advanced), and provides wireless connection to a terminal positioned in a cell of the gNB 1800 via the antenna 1810. The wireless communication interface 1825 may typically include, for example, a baseband (BB) processor 1826 and a RF circuit 1827. The BB processor 1826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1826 may have a part or all of the above-described logical functions instead of the controller 1821. The BB processor 1826 may be a memory which stores a communication control program, or a module that includes a processor and a related circuit configured to execute the program. Updating the programs may change functions of the BB processor 1826. The module may be a card or a blade which is inserted into a slot of the base station device 1820. Alternatively, the module may also be a chip that is mounted on the card or the blade. In addition, the RF circuit 1827 may include, for example, a frequency mixer, a filter, and an amplifier, and transmits and receives wireless signals via the antenna 1810.

As shown in FIG. 18, the wireless communication interface 1825 may include multiple BB processors 1826. For example, the multiple BB processors 1826 may be compatible with multiple frequency bands used by the gNB 1800. As shown in FIG. 18, the wireless communication interface 1825 may include multiple RF circuits 1827. For example, the multiple RF circuits 1827 may be compatible with multiple antenna elements. Although FIG. 18 shows the example in which the wireless communication interface 1825 includes the multiple BB processors 1826 and the multiple RF circuits 1827, the wireless communication interface 1825 may also include a single BB processor 1826 or a single RF circuit 1827.

Figure 19:
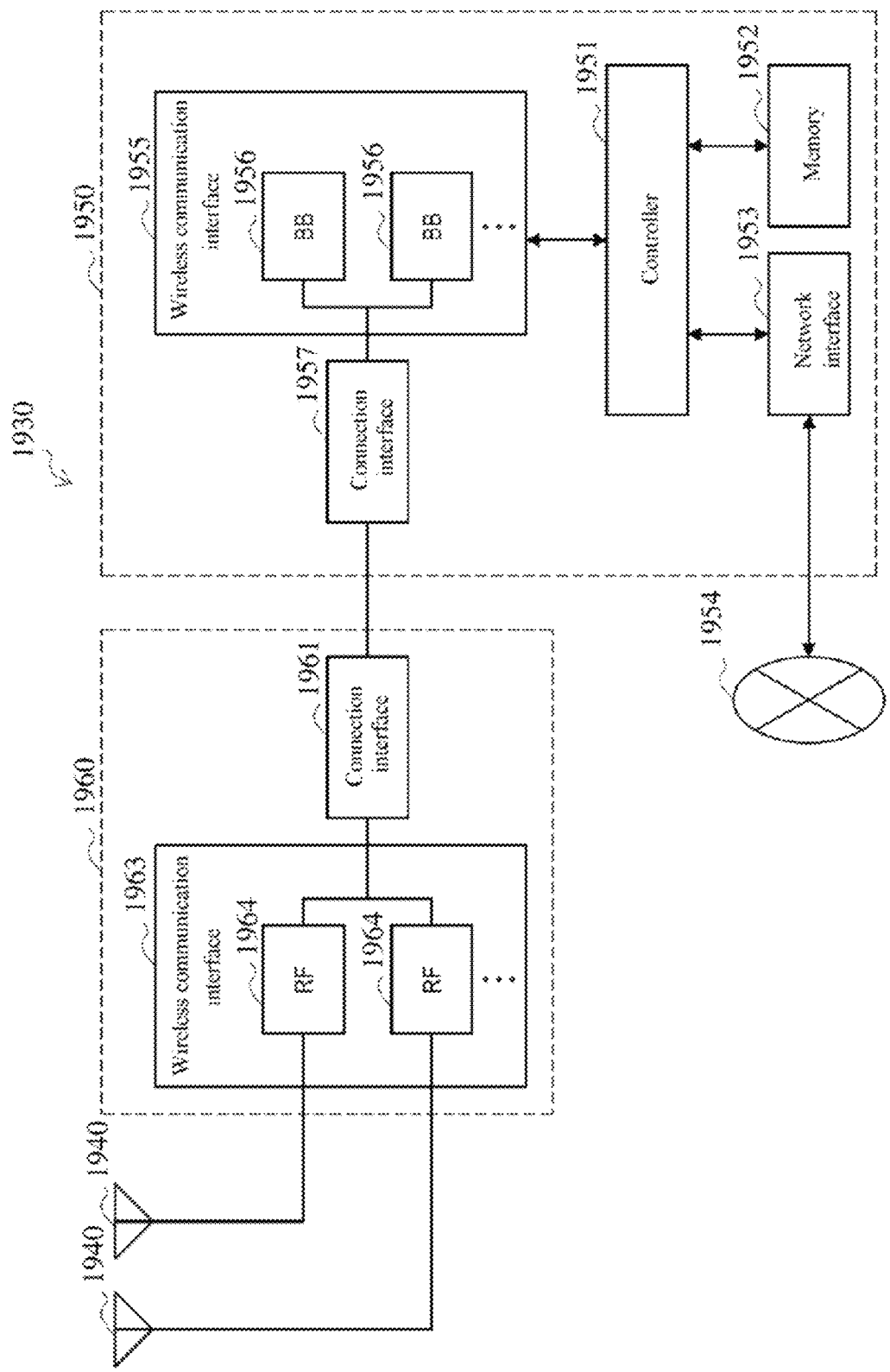
FIG. 19 is a block diagram showing a second example of a schematic configuration of a gNB.

FIG. 19 is a block diagram showing a second example of a schematic configuration of a gNB to which the technology according to the present disclosure may be applied. A gNB 1930 includes one or more antennas 1940, a base station device 1950, and a RRH 1960. Each of the antennas 1940 and the RRH 1960 may be connected to each other via a RF cable. The base station device 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive wireless signals. As shown in FIG. 19, the gNB 1930 may include multiple antennas 1940. For example, the multiple antennas 1940 may be compatible with multiple frequency bands used by the gNB 1930. Although FIG. 19 shows the example in which the gNB 1930 includes the multiple antennas 1940, the gNB 1930 may also include a single antenna 1940.

The base station device 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 18.

The wireless communication interface 1955 supports any cellular communication scheme (such as LTE and LTE-Advanced), and provides wireless communication to a terminal positioned in a sector corresponding to the RRH 1960 via the RRH 1960 and the antenna 1940. The wireless communication interface 1955 may typically include, for example, a BB processor 1956. Other than connecting to a RF circuit 1964 of the RRH 1960 via the connection interface 1957, the BB processor 1956 is the same as the BB processor 1826 described with reference to FIG. 18. As shown in FIG. 19, the wireless communication interface 1955 may include multiple BB processors 1956. For example, the multiple BB processors 1956 may be compatible with multiple frequency bands used by the gNB 1930. Although FIG. 19 shows the example in which the wireless communication interface 1955 includes the multiple BB processors 1956, the wireless communication interface 1955 may also include a single BB processor 1956.

The connection interface 1957 is an interface for connecting the base station device 1950 (the wireless communication interface 1955) to the RRH 1960. The connection interface 1957 may be a communication module for a communication of the above high-speed line, which is used for connecting the base station device 1950 (the wireless communication interface 1955) the RRH 1960.

The RRH 1960 includes a connection interface 1961 and a wireless communication interface 1963.

The connection interface 1961 is an interface for connecting the RRH 1960 (the wireless communication interface 1963) to the base station device 1950. The connection interface 1961 may also be a communication module for the communication in the above high speed line.

The wireless communication interface 1963 transmits and receives wireless signals via the antenna 1940. The wireless communication interface 1963 may typically include, for example, the RF circuit 1964. The RF circuit 1964 may include, for example, a frequency mixer, a filter, and an amplifier, and transmits and receives wireless signals via the antenna 1940. As shown in FIG. 19, the wireless communication interface 1963 may include multiple RF circuits 1964. For example, the multiple RF circuits 1964 may support multiple antenna elements. Although FIG. 19 shows the example in which the wireless communication interface 1963 includes the multiple RF circuits 1964, the wireless communication interface 1963 may also include a single RF circuit 1964.

In the gNB 1800 and the gNB 1930 respectively shown in FIG. 18 and FIG. 19, the cycle configuration unit 210, the format configuration unit 220, the generation unit 240, the storage unit 250, and the format management unit 260 shown in FIG. 2 may be respectively implemented by the controller 1821 and/or the controller 1951. At least a part of the functions may also be implemented by the controller 1821 and the controller 1951. For example, the controller 1821 and/or and the controller 1951 may execute instructions stored in respective memory to perform the functions of time slot format cycle configuration, time slot format configuration, configuration information generation, time slot format storage, and time slot format management.

Figure 20:
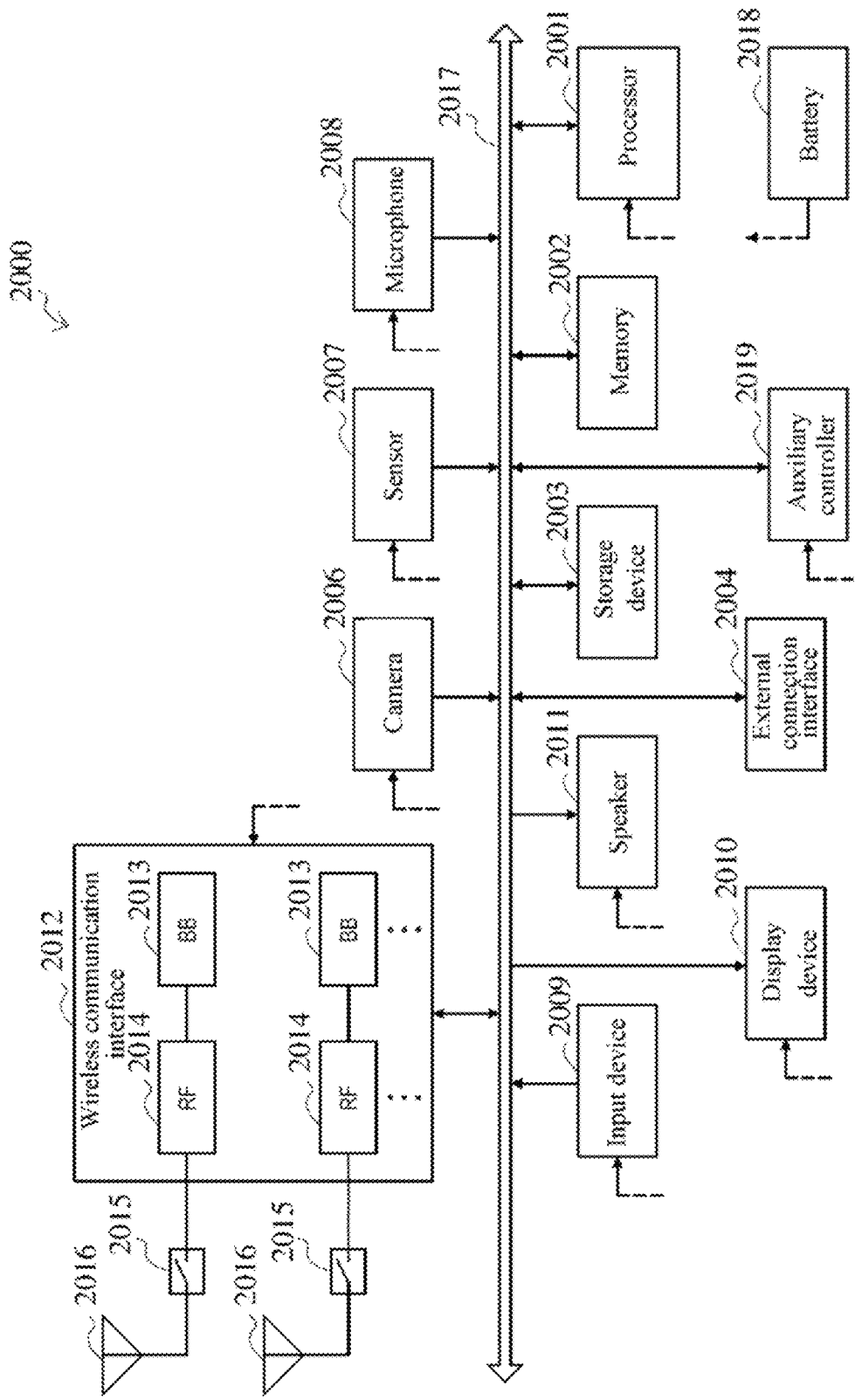
FIG. 20 is a block diagram showing an example of a schematic configuration of a smartphone.

FIG. 20 is a block diagram showing an example of a schematic configuration of a smartphone 2000 to which the technology according to the present disclosure may be applied. The smartphone 2000 includes a processor 2001, a memory 2002, a storage device 2003, an external connection interface 2004, a camera 2006, a sensor 2007, a microphone 2008, an input device 2009, a display device 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on a chip (SoC), and controls functions of an application layer and another layer of the smartphone 2000. The memory 2002 includes a RAM and a ROM, and stores programs executed by the processor 2001 and data. The storage device 2003 may include a storage medium, such as a semiconductor memory and a hard disk. The external connection interface 2004 is an interface for connecting an external device (such as a memory card and a universal serial bus (USB) device) to the smart phone 2000.

The camera 2006 includes an image sensor (such as a charge coupled device (CCD) and a complementary metal oxide semiconductor (CMOS)) and generates a captured image. The sensor 2007 may include a set of sensors, such as a measurement sensor, a gyroscope sensor, a geomagnetic sensor and an acceleration sensor. The microphone 2008 converts sound inputted into the smart phone 2000 into an audio signal. The input device 2009 includes, for example, a touch sensor configured to detect touch onto a screen of the display device 2010, a keypad, a keyboard, a button, or a switch, and receives an operation or information inputted from a user. The display device 2010 includes a screen (such as a liquid crystal display (LCD) and an organic light-emitting diode (OLED) display), and displays an output image of the smartphone 2000. The loudspeaker 2011 converts the audio signal outputted from the smart phone 2000 into sound.

The wireless communication interface 2012 supports any cellular communication scheme (such as LTE and LTE-advanced), and performs wireless communication. The wireless communication interface 2012 may generally include, for example, a BB processor 2013 and a RF circuit 2014. The BB processor 2013 may perform, for example, encoding/decoding, modulating/demodulating, and multiplexing/de-multiplexing, and perform various types of signal processing for wireless communication. In addition, the RF circuit 2014 may include, for example, a frequency mixer, a filter, and an amplifier, and transmits and receives wireless signals via an antenna 2016. The wireless communication interface 2012 may be a one chip module having the BB processor 2013 and the RF circuit 2014 integrated thereon. As illustrated in FIG. 20, the wireless communication interface 2012 may include the multiple BB processors 2013 and the multiple RF circuits 2014. Although FIG. 20 shows the example in which the wireless communication interface 2012 includes the multiple BB processors 2013 and the multiple RF circuits 2014, the wireless communication interface 2012 may also include a single BB processor 2013 or a single RF circuit 2014.

Furthermore, in addition to a cellular communication scheme, the wireless communication interface 2012 may support another type of wireless communication scheme, such as a short-distance wireless communication scheme, a near field communication scheme, and a wireless local area network (LAN) scheme. In this case, the wireless communication interface 2012 may include the BB processor 2013 and the RF circuit 2014 for each of the wireless communication schemes.

Each of the antenna switches 2015 switches connection destinations of the antennas 2016 among multiple circuits (such as circuits for different wireless communication schemes) included in the wireless communication interface 2012.

Each of the antennas 2016 includes a single or multiple antenna elements (such as multiple antenna elements included in an MIMO antenna), and is used for the wireless communication interface 2012 to transmit and receive wireless signals. As shown in FIG. 20, the smartphone 2000 may include the multiple antennas 2016. Although FIG. 20 shows the example in which the smartphone 2000 includes the multiple antennas 2016, the smartphone 2000 may also include a single antenna 2016.

Furthermore, the smartphone 2000 may include the antenna 2016 for each wireless communication scheme. In this case, the antenna switch 2015 may be omitted from the configuration of the smart phone 2000.

The bus 2017 connects the processor 2001, the memory 2002, the storage device 2003, the external connection interface 2004, the camera 2006, the sensor 2007, the microphone 2008, the input device 2009, the display device 2010, the loudspeaker 2011, the wireless communication interface 2012 and the auxiliary controller 2019 with each other. The battery 2018 supplies power for blocks in the smart phone 2000 shown in FIG. 20 via a feeder which is indicated partially as a dashed line in FIG. 20. The auxiliary controller 2019, for example, controls a minimum necessary function for operating the smart phone 2000 in a sleeping mode.

Figure 21:
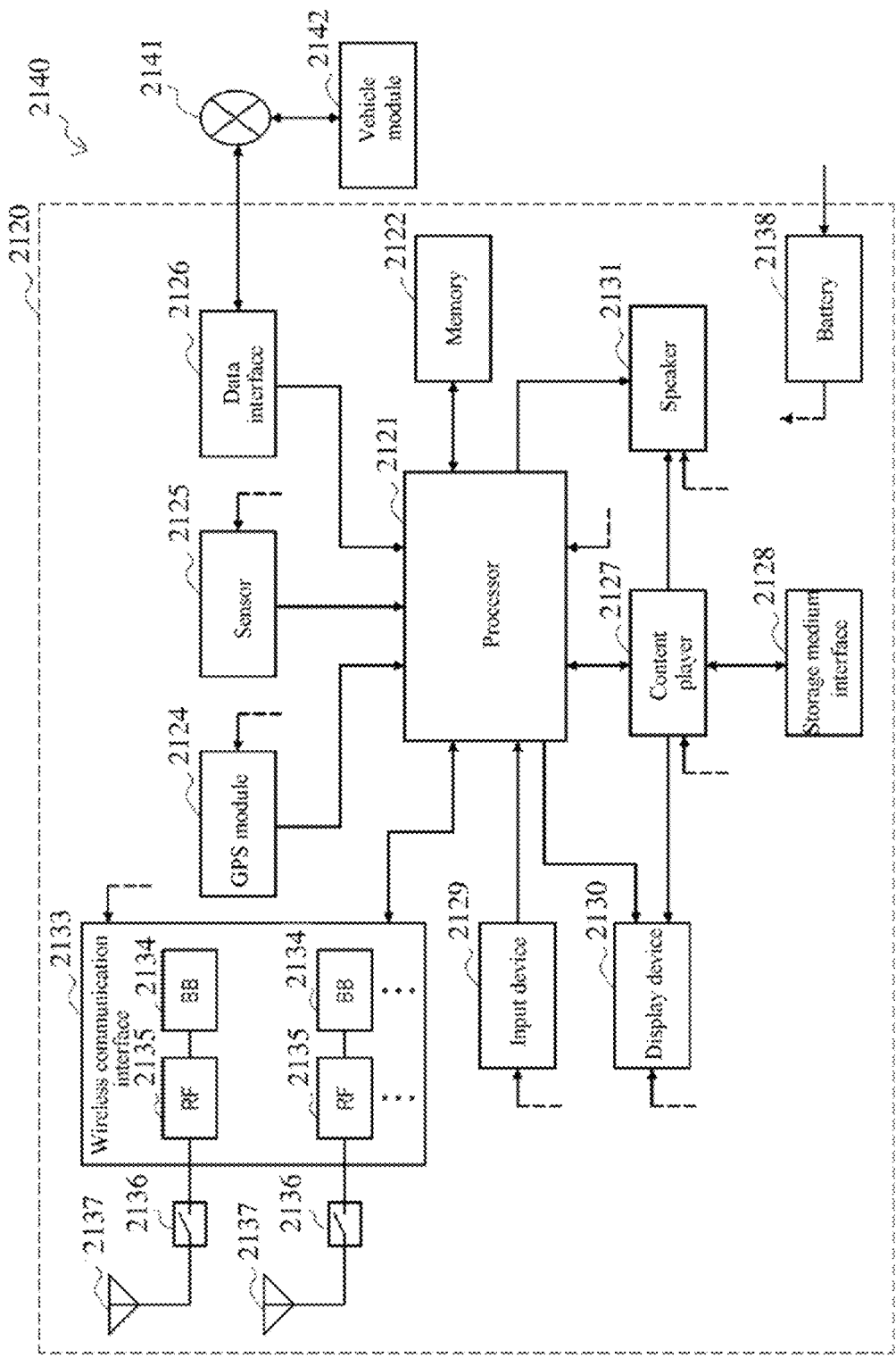
FIG. 21 is a block diagram showing an example of a schematic configuration of a car navigation device.

FIG. 21 is a block diagram showing an example of a schematic configuration of a car navigation device 2120 to which the technology according to the present disclosure may be applied. The car navigation device 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a wireless communication interface 2133, one or more antenna switches 2136, one or more antennas 2137, and a battery 2138.

The processor 2121 may be, for example, a CPU or a SoC, and controls the navigation function and additional functions of the car navigation device 2120. The memory 2122 includes a RAM and a ROM, and stores programs executed by the processor 2121 and data.

The GPS module 2124 measures a position (such as a latitude, a longitude, and a height) of the car navigation device 2120 based on a GPS signal received from a GPS satellite. The sensor 2125 may include a group of sensors, such as, a gyroscope sensor, a geomagnetic sensor, and an air pressure sensor. The data interface 2126 is connected to, for example, an in-vehicle network 2141 via a terminal which is not shown, and acquires data generated by the vehicle (such as vehicle speed data).

The content player 2127 reproduces contents stored in a storage medium (such as a CD and a DVD), where the storage medium is inserted into the storage medium interface 2128. The input device 2129 includes, for example, a touch sensor configured to detect touch on a screen of the display device 2130, a button, or a switch, and receives an operation or information inputted from a user. The display device 2130 includes a screen, for example, an LCD display or an OLED display, and displays an image with a navigation function or the reproduced content. The loudspeaker 2131 outputs a sound with a navigation function or the reproduced content.

The wireless communication interface 2133 supports any cellular communication scheme (such as, LTE and LTE-Advanced), and performs wireless communication. The wireless communication interface 2133 may usually include, for example, a BB processor 2134 and a RF circuit 2135. The BB processor 2134 may perform, for example, encoding/decoding, modulating/demodulating, and multiplexing/de-multiplexing, and performs various types of signal processing for wireless communication. In addition, the RF circuit 2135 may include, for example, a frequency mixer, a filter, and an amplifier, and transmit and receive wireless signals via the antenna 2137. The wireless communication interface 2133 may also be a chip module on which the BB processor 2134 and the RF circuit 2135 are integrated. As shown in FIG. 21, the wireless communication interface 2133 may include multiple BB processors 2134 and multiple RF circuits 2135. Although FIG. 21 shows an example in which the wireless communication interface 2133 includes multiple BB processors 2134 and multiple RF circuits 2135, the wireless communication interface 2133 may include a single BB processor 2134 or a single RF circuit 2135.

Furthermore, in addition to a cellular communication scheme, the wireless communication interface 2133 may support another type of wireless communication scheme, such as a short-distance wireless communication scheme, a near field communication scheme, and a wireless LAN scheme. In this case, for each of the wireless communication schemes, the wireless communication interface 2133 may include a BB processor 2134 and a RF circuit 2135.

Each of the antenna switches 2136 switches connection destinations of the antennas 2137 among multiple circuits (such as circuits for different wireless communication schemes) included in the wireless communication interface 2133.

Each of the antennas 2137 includes one or more antenna elements (such as multiple antenna elements included in a MIMO antenna) and is used by the wireless communication interface 2133 to transmit and receive wireless signals. As shown in FIG. 21, the car navigation device 2120 may include multiple antennas 2137. Although FIG. 21 shows the example in which the car navigation device 2120 includes the multiple antennas 2137, the car navigation device 2120 may also include a single antenna 2137.

Furthermore, the car navigation device 2120 may include an antenna 2137 for each of the wireless communication schemes. In this case, the antenna switch 2136 may be omitted from the configuration of the car navigation device 2120.

The battery 2138 supplies power to each of the blocks of the car navigation device 2120 shown in FIG. 21 via feeders which are partially shown with dashed lines in FIG. 21. The battery 2138 accumulates power supplied from the vehicle.

The technology according to the present disclosure may also be implemented as an in-vehicle system (or a vehicle) 2140 including one or more blocks of the car navigation device 2120, the in-vehicle network 2141 and a vehicle module 2142. The vehicle module 2142 generates vehicle data (such as vehicle speed, engine speed, and fault information), and outputs the generated data to the in-vehicle network 2141.

The preferred embodiments of the present disclosure have been described above with reference to the accompanying drawings, and the present disclosure is not limited thereto. Those skilled in the art can obtain various changes and modifications within the scope of the claims, and it should be understood that these changes and modifications should fall within the technical scope of the present disclosure.

For example, the units shown in dashed boxes in the functional block diagrams shown in the drawings indicate that the functional units are optional in the device, and each of the optional functional unit can be combined in a certain manner to perform the required functions.

For example, the functions included in one unit in the embodiments may be performed by separate devices. Alternatively, the multiple functions implemented by multiple units in the embodiments may be respectively performed by separate devices. In addition, each of the functions can be performed by multiple units. Such configurations are included in the technical scope of the present disclosure.

In this specification, the steps shown in the flow charts can be performed sequentially in time series, and can be performed in parallel or individually instead of necessarily being performed in time series. In addition, for steps performed in time series, the order can be changed appropriately.

Although the embodiments of the present disclosure have been described above in detail in connection with the drawings, it should be appreciated that the embodiments described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus in an Integrated Access and Backhaul (IAB) system, comprising:
   processing circuitry, configured to:
   configure, according to a subcarrier interval of a link between the electronic apparatus and a child node of the electronic apparatus, a time slot format cycle for the link, wherein the time slot format cycle comprises a predetermined number of time slots; and
   configure, for the link, a time slot format of each of the time slots within one time slot format cycle,
   wherein the processing circuitry is further configured to configure the time slot format cycle for the link such that the subcarrier interval of the link is proportional to a number of the time slots comprised in the time slot format cycle.

2. The electronic apparatus according to claim 1, wherein the processing circuitry is further configured to
   cause uplink/downlink configuration of each of symbols within the time slot format cycle of the link to be opposite to uplink/downlink configuration of a corresponding symbol within the time slot format cycle of a link between the electronic apparatus and a parent node of the electronic apparatus, or to be the same as uplink/downlink configuration of a corresponding symbol within the time slot format cycle of the link between the electronic apparatus and another child node of the electronic apparatus.

3. The electronic apparatus according to claim 1, wherein the processing circuitry is further configured to transmit time slot configuration information indicating information of the time slot format of each of the time slots within one time slot format cycle for the link to the child node, and
   wherein the time slot configuration information comprises identification information of the time slot format of each of the time slots within one time slot format cycle, or
   the time slot configuration information comprises identification information of each of one or more time slots in which uplink/downlink conversion occurs within one time slot format cycle, and identification information of a time slot format of the time slot.

4. The electronic apparatus according to claim 1, wherein the electronic apparatus is a donor node (DN).

5. The electronic apparatus according to claim 4, wherein the processing circuitry is further configured to
   configure, for each of links in the IAB system, an updated time slot format of each of time slots within one time slot format cycle; and
   transmit updated time slot configuration information to all other nodes in the IAB system.

6. The electronic apparatus according to claim 5, wherein the processing circuitry is further configured to
   transmit update request information to all the other nodes in the IAB system; and
   receive update response information from the other nodes, and
   wherein the update request information comprises update starting time of the updated time slot format.

7. The electronic apparatus according to claim 6, wherein the processing circuitry is further configured to retransmit the update request information to one or more other nodes if the update response information indicates that the one or more other nodes have not received the update request information, and
   wherein the processing circuitry is further configured to transmit the updated time slot configuration information to all the other nodes in the IAB system if the update response information indicates that all the other nodes have received the update request information.

8. The electronic apparatus according to claim 1, wherein the electronic apparatus is a relay node (RN).

9. The electronic apparatus according to claim 8, wherein the processing circuitry is further configured to
   configure, for the link between the electronic apparatus and the child node of the electronic apparatus and the link between the electronic apparatus and the parent node of the electronic apparatus, an updated time slot format of each of the time slots within one time slot format cycle; and
   transmit updated time slot configuration information to the child node and the parent node of the electronic apparatus.

10. The electronic apparatus according to claim 9, wherein the processing circuitry is further configured to transmit update starting time and update duration of the updated time slot format to the child node and the parent node of the electronic apparatus.

11. The electronic apparatus according to claim 10, wherein the processing circuitry is further configured to:
    receive response information indicating whether to agree to update the time slot format respectively from the child node and the parent node of the electronic apparatus; and
    update the time slot format at the update starting time, and restore, after the update duration, the time slot format to the time slot format before being updated if both the response information from the child node of the electronic apparatus indicates that the child node agrees to update the time slot format and the response information from the parent node of the electronic apparatus indicates that the parent node agrees to update the time slot format.

12. An electronic apparatus in an Integrated Access and Backhaul (IAB) system, comprising:
    processing circuitry, configured to:
    receive, from a parent node of the electronic apparatus, a time slot format cycle of a link between the electronic apparatus and the parent node, wherein the time slot format cycle comprises a predetermined number of time slots;
    receive time slot configuration information from the parent node; and determine, according to the time slot configuration information, a time slot format of each of time slots of the link within one time slot format cycle, wherein the time slot configuration information comprises identification information of the time slot format of each of the time slots within one time slot format cycle, or the time slot configuration information comprises identification information of each of one or more time slots in which uplink/downlink conversion occurs within one time slot format cycle, and identification information of a time slot format of the time slot.

13. The electronic apparatus according to claim 12, wherein the processing circuitry is further configured to:
receive updated time slot configuration information from a donor node (DN); and
determine, according to the updated time slot configuration information, an updated time slot format of each of the time slots of the link within one time slot format cycle.

14. The electronic apparatus according to claim 13, wherein the processing circuitry is further configured to:
receive update request information from the DN; and
transmit update response information to the DN, and
wherein the update request information comprises update starting time of the updated time slot format.

15. The electronic apparatus according to claim 12, wherein the processing circuitry is further configured to:
receive updated time slot configuration information from the parent node of the electronic apparatus; and
determine, according to the updated time slot configuration information, an updated time slot format of each of the time slots of the link within one time slot format cycle.

16. The electronic apparatus according to claim 15, wherein the processing circuitry is further configured to:
receive update starting time and update duration of the updated time slot format from the parent node of the electronic apparatus;
update the time slot format of each of the time slots within one time slot format cycle at the update starting time; and
restore, after the update duration, the time slot format to the time slot format before being updated.

17. The electronic apparatus according to claim 15, wherein the processing circuitry is further configured to transmit response information indicating whether to agree to update the time slot format to the parent node of the electronic apparatus.

18. A wireless communication method performed by an electronic apparatus in an Integrated Access and Backhaul (IAB) system, comprising:
configuring, according to a subcarrier interval of a link between the electronic apparatus and a child node of the electronic apparatus, a time slot format cycle for the link, wherein the time slot format cycle comprises a predetermined number of time slots; and
configuring, for the link, a time slot format of each of the time slots within one time slot format cycle,
wherein the time slot format cycle is configured for the link such that the subcarrier interval of the link is proportional to a number of the time slots comprised in the time slot format cycle.

* * * * *